United States Patent
Mennes et al.

(10) Patent No.: US 10,205,711 B2
(45) Date of Patent: Feb. 12, 2019

(54) MULTI-USER STRONG AUTHENTICATION TOKEN

(71) Applicant: ONESPAN NORTH AMERICA INC., Chicago, IL (US)

(72) Inventors: Frederik Mennes, Brecht (BE); Guy Couck, Denderleeuw (BE); Bert Fierens, Grimbergen (BE); Sebastien Lavigne, Le Bouscat (FR); Harm Braams, Nieuwegein (NL); Tom De Wasch, Ghent-Bruges (BE); Guillaume Teixeron, Le Bouscat (FR)

(73) Assignee: ONESPAN NORTH AMERICA INC., Chicago, IL (US)

(*) Notice: Subject to any disclaimer, the term of this patent is extended or adjusted under 35 U.S.C. 154(b) by 266 days.

(21) Appl. No.: 14/928,516

(22) Filed: Oct. 30, 2015

(65) Prior Publication Data

US 2017/0012951 A1    Jan. 12, 2017

Related U.S. Application Data

(60) Provisional application No. 62/073,457, filed on Oct. 31, 2014.

(51) Int. Cl.
*G06F 21/00* (2013.01)
*H04L 29/06* (2006.01)
(Continued)

(52) U.S. Cl.
CPC ............ *H04L 63/06* (2013.01); *H04L 9/0891* (2013.01); *H04L 9/32* (2013.01); *H04L 9/3215* (2013.01);
(Continued)

(58) Field of Classification Search
CPC ....... H04L 63/06; H04L 63/10; H04L 63/083; H04L 9/0891; H04L 9/32; H04L 9/3215; H04L 9/3234; H04L 9/3228
See application file for complete search history.

(56) References Cited

U.S. PATENT DOCUMENTS

| 2007/0118745 A1* | 5/2007 | Buer | G06F 21/34 |
| | | | 713/168 |
| 2014/0040628 A1* | 2/2014 | Fort | G06F 21/34 |
| | | | 713/182 |
| 2014/0101453 A1* | 4/2014 | Senthurpandi | H04L 63/0861 |
| | | | 713/172 |

FOREIGN PATENT DOCUMENTS

WO    WO-2014200950 A1 * 12/2014  ............. H04L 63/08

OTHER PUBLICATIONS

Chia-Hsin Owen Chen, Chung-Wei Chen, Cynthia Kuo, Yan-Hao Lai, Jonathan M. McCune, Ahren Studer, Adrian Perring, Bo-Yin Yang, Tzong-Chen Wu; GAnGS: gather, authenticate 'n group securely; Sep. 2008; Publisher: ACM; pp. 92-103 (Year: 2008).*
(Continued)

*Primary Examiner* — Kendall Dolly
*Assistant Examiner* — Courtney D Fields
(74) *Attorney, Agent, or Firm* — RatnerPrestia

(57) ABSTRACT

A strong authentication token supporting multiple instances associated with different users and protected by a user identity verification mechanism is disclosed. A multi-instance strong authentication token may be adapted to generate dynamic credentials using cryptographic secrets that are specific to a particular instance stored in the token. A method and a system to secure remotely accessible applications using strong authentication tokens supporting multiple instances are disclosed. A method for loading additional tokens into a multi-instance authentication token is disclosed.

45 Claims, 3 Drawing Sheets

(51) Int. Cl.
*H04L 9/32* (2006.01)
*H04L 9/08* (2006.01)
G06F 21/33 (2013.01)
H04L 29/08 (2006.01)

(52) U.S. Cl.
CPC .......... *H04L 9/3228* (2013.01); *H04L 9/3234* (2013.01); *H04L 63/083* (2013.01); *H04L 63/10* (2013.01)

(56) References Cited

OTHER PUBLICATIONS

International Preliminary Report on Patentability for International Application No. PCT/US2015/058365, dated May 11, 2017, 8 pages.
International Search Report and Written Opinion for PCT/US2015/058365 dated Jun. 30, 2016.

\* cited by examiner

MULTI-USER STRONG AUTHENTICATION TOKEN

FIELD OF THE INVENTION

The invention relates to securing remote access to computers and applications and remote transactions over computer networks. More specifically, the invention relates to methods and apparatus allowing multiple users to share the same strong authentication token for securing access to remote applications.

BACKGROUND OF THE INVENTION

As remote access of computer systems and applications grows in popularity, the number and variety of transactions which are accessed remotely over public networks such as the Internet has increased dramatically. This popularity has underlined a need for security; in particular: how to ensure that people who are remotely accessing an application are who they claim they are, how to ensure that transactions being conducted remotely are initiated by legitimate individuals, and how to ensure that transaction data has not been altered before being received at an application server. In the context of this description, and unless otherwise indicated or clear from the context, application refers to a remotely accessible computer based application which is hosted by one or more application server computers and which may be remotely accessed by a user who is locally interacting with a client computing device whereby the user's client computing device and the application server or application servers are connected by means of a computer network. For example, the user may be interacting with a personal computer or a smartphone running a web browser whereby the personal computer or smartphone may be connected by means of the internet with a webserver hosting the application and whereby the web browser and the webserver may exchange for example Hypertext Transfer Protocol (HTTP) messages. In another example the user may be interacting with a mobile app running on a smartphone that is connected with a remote server. The application may for example comprise an online banking application.

One way to secure access to remote applications is the use of so-called strong authentication tokens. In the context of this description a strong authentication token (or authentication token or token in short) is a compact handheld electronic device comprising data processing means capable of certain cryptographic calculations. The device is adapted to generate dynamic authentication credentials on behalf of a user by performing a cryptographic algorithm on one or more inputs comprising at least one dynamic variable whereby the cryptographic algorithm is parameterized by one or more secret cryptographic keys that may be associated with that user. The dynamic variable may for example comprise a time value (which may be provided by a real-time clock comprised in the authentication token), it may comprise the value of a challenge which may be provided to the authentication token (e.g. a string of decimal digits entered into the authentication token), it may comprise the value of a counter that may be maintained by the authentication token and that may for example be incremented (or decremented) each time that the counter is used to generate a credential, it may comprise a value derived from a previously generated credential (it may for example comprise the previous value of the credential), it may comprise data representing a transaction that needs to be authenticated, and it may comprise any combination of the above.

In case the token has generated the dynamic authentication credential using just a time, counter, or challenge value, the generated credential may also be referred to as a one-time password. If the token has generated the dynamic authentication credential using transaction data, then the dynamic authentication credential may also be referred to as a signature or transaction data signature.

The strong authentication token may present the generated dynamic authentication credential to the user so that the user can forward the generated credential to an application so that the application can verify the credential. For example a strong authentication token may generate a dynamic authentication credential consisting of a string of digits and may present the dynamic authentication credential to the user by displaying the string of digits on the token's display.

Some strong authentication tokens are relatively simple and may offer only basic one-time password functionality and may have only a very limited user interface comprising nothing more than just a single on/off-button and a 7-segment display to display a 6-digit one-time password. Other strong authentication tokens are more complex. For example some high-end strong authentication tokens may be capable of offering a range of functionality including generating signatures over transaction data and may comprise for example a camera to capture an image encoded with relatively large amounts of data to be signed, more powerful data processing means to process and decode the captured images and a more sophisticated user interface capable of presenting relatively large amounts of data to the user through for example a graphical display.

The discussion of the background to the invention herein is included to explain the context of the invention. This shall not be taken as an admission that any of the material discussed above was published, known or part of the common general knowledge at the priority date of this application.

DISCLOSURE OF THE INVENTION

Technical Problem

The use of more sophisticated high-end strong authentication tokens allows securing much more complex transactions in a more secure and more user-friendly way than simpler tokens. However, a camera, more powerful data processing means and sophisticated user interface tend to be relatively expensive, making the cost of sophisticated strong authentication tokens significantly higher than the cost of simple basic one-time password tokens. This extra cost may inhibit the widespread adoption of the high-end strong authentication tokens in spite of their advantages in terms of security and user-friendliness.

What is needed are ways to mitigate the cost of using such high-end strong authentication tokens while preserving the advantages that their use offers.

Technical Solution

The invention is based on an insight of the inventors that the overall cost of securing applications by application users using relatively expensive high-end strong authentication tokens can be significantly diminished if it is possible for different application users (for example members of the same household) to share the same strong authentication tokens.

The invention is furthermore based on an insight of the inventors that it may be possible for different users to share a single strong authentication token if this single strong authentication token is capable of comprising multiple token instances whereby each instance may have its own set of cryptographic secrets (or data for determining such cryptographic secrets) and parameters for generating dynamic credentials such as signatures and one-time passwords and whereby different instances may be associated with different users.

The invention is furthermore based on an insight of the inventors that a higher level of security can be obtained if the strong authentication token restricts the usage of each separate instance to the legitimate user associated with that instance.

The invention is furthermore based on the insight that it is advantageous if the logistic process to make the use of multiple instance strong authentication tokens available to users is such that individual instances can be created and/or allocated to specific users and/or loaded into specific tokens after the strong authentication tokens have already been distributed to users.

In the context of this description the terminology user may refer to a physical person, but it may also refer to a virtual user e.g. the same physical person may be represented by multiple virtual user identities. I.e. different users may be different physical persons but different users may also be different virtual user identities corresponding to the same physical person.

Authentication Token Supporting Multiple Instances

In one aspect of the invention a system for authenticating users or transactions for securing interaction between a plurality of users and one or more applications is provided.

Multiple Instances on a Single Authentication Token

In some embodiments a single strong authentication token may comprise more than one token instance. A token instance (or instance in short) may be understood as comprising all individualized data comprised in an authentication token that are associated with a particular user and that define how the token functions differently for that particular user than for another user. In particular an instance may comprise one or more cryptographic keys that are used by the authentication token to generate dynamic authentication credentials for the user associated with that instance or an instance may comprise data elements that the authentication token may use to determine or derive the values of one or more cryptographic keys that are used by the authentication token to generate dynamic authentication credentials for the user associated with that instance. In some embodiments an instance may also comprise some parameters that may define the values for attributes such as the way a generated dynamic credential is encoded before it is presented to the user (e.g. decimal, hexadecimal, alphanumeric, . . . ), how many digits are comprised in the dynamic credential, . . . . In some embodiments an instance may also comprise reference data that allow the authentication token to verify whether a user is indeed the legitimate user associated with the instance. For example, in some embodiments an instance may comprise a PIN reference value or a biometric reference data set. In some embodiments an instance may also comprise parameters and data that are related to the life cycle of the instance such as PIN management related data. Such parameters and data may for example include flags that indicate whether an initial PIN must still be changed, whether the instance is enabled or blocked, a PIN Try Counter, a Maximum PIN Try Counter, a parameter that indicates whether a locked instance shall be automatically deleted or not, a PIN Unlock Code, . . . . In some embodiments an instance may also comprise data that are user dependent and that may have a function in improving the user experience and the user convenience. For example the instance may comprise some user dependent message values or titles (such as a name of the instance), or an instance may comprise a language preference indicator which may indicate to the authentication token which of a number of languages supported by the authentication token the user prefers. In some embodiments an instance may also comprise an instance identifying data element (or instance identifier) such as for example an instance serial number. In some embodiments such an instance identifying data element may be unique over an entire batch of tokens. In some embodiments an instance identifying data element may be unique only among the instances of a single token. In some embodiments the combination of an instance identifying data element of a particular instance of a particular token and a token identifying data element (such as a token serial number) may be unique among all instances of all tokens of an entire batch of tokens.

Some of the data elements comprised in or associated with a particular instance may be stored in a particular area of the token's memory (whereby that area may be reserved for storing data associated with that particular instance), and the token may retrieve or read these data elements from that memory area associated with that particular instance when needed. Other data elements of an instance are not permanently stored in a memory area associated with a particular instance. Some data elements of an instance are created or re-created by the token when needed, for example by using other data elements of that instance. Some of these other data elements that are used by the token to obtain certain data elements of the instance may be stored in and read from a token's memory area that is associated with that instance. For example in some embodiments a cryptographic key that is associated with a particular instance may be stored in an area of the memory of the token that is reserved for that particular instance, and the token may obtain that cryptographic key (e.g. for generating a dynamic credential or decrypting a message) by reading it from the memory area associated with that instance. In some embodiments a particular cryptographic key of a particular instance may not be permanently stored in the memory area associated with that instance, but that particular cryptographic key may, when it is needed by the token, be obtained by the token by deriving it from another data element of that instance. For example, in some embodiments a token may derive a particular cryptographic key of a particular instance by cryptographically combining a token master key with a data element identifying that particular instance (such as the instance's serial number). In another embodiment the token may derive a particular cryptographic key of a particular instance by cryptographically deriving it from another cryptographic key of that instance using a key diversification data element (which may for example be associated with the type of operation for which the token will use the derived cryptographic key).

Relations Between Instances and Users

In some embodiments the various token instances of a single strong authentication token that comprises more than one token instance may be associated with different users. In some embodiments each instance comprised in the same token is associated with a different user. In some embodiments multiple instances associated with the same user may be comprised in the same token. In some embodiments a number of instances associated with the same user may constitute a user instance group. In some embodiments instances of the same user instance group may share certain data elements (for example a user instance group identifying data element such as a user instance group serial number). In some embodiments there may be a cryptographic link between the values of some corresponding data elements of the instances of the same user instance group. For example in some embodiments the values of one or more cryptographic keys of the instances of a same user instance group may all be derived from the same master key that is associated with the user instance group and that may have a different value for another user instance group. In some embodiments only a single user instance group can be associated with a single user. In other embodiments multiple user instance groups can be associated with the same user. In some embodiments a token can only comprise one instance of the same user instance group, but may comprise multiple instances associated with the same user provided that these instances all belong to different user instance groups.

In some embodiments each instance on any token is unique i.e. the same instance can only be comprised in one single token. In other embodiments multiple copies of the same instance may exist on more than one different token. In some embodiments multiple copies of the same instance may be associated with the same user. In some embodiments multiple instances that may be comprised in different tokens may be associated with the same user and may share certain data values and attributes. In some embodiments multiple instances that are comprised in different tokens and that are associated with the same user may share the values for certain data and attributes but may have different values for other data and attributes. For example in some embodiments multiple instances associated with the same user may be comprised in different tokens and all these instances may share the same cryptographic keys but may have a different PIN or password reference value and/or a different PIN try counter.

Multi-Application Support

In some embodiments all instances on a token are related to the same application. In other embodiments a token may comprise instances that are related to different applications.

In some embodiments any instances may be associated with only a single application or a single set of applications and an instance may share its dynamic credential generation keys with the application or set of applications that it is associated with.

Instance Life-Cycle

Creating and Allocating Instances

In some embodiments strong authentication tokens may comprise a number of instances that are created (for example by an application) and loaded into the strong authentication tokens prior to the tokens being provided to the end-users. In such embodiments the various pre-loaded instances of a particular strong authentication token may be allocated to the various members of a group of end-users (such as the members of a household) that are supposed to share the strong authentication token prior to the token being provided to (one member of) the group. In other embodiments one instance is allocated to the first member of a group of end-users and after the token has been provided to that first member subsequent members of the group can enroll and upon enrollment an instance that hasn't been allocated yet may be allocated to and associated with each subsequently enrolling member.

Alternatively, in some embodiments tokens may be distributed to end-users without any instances loaded into them. When a particular user wants to use a particular token, the user may load a particular instance associated with that user into that particular token. In some embodiments the same instance (associated with a particular user) can be loaded into multiple different strong authentication tokens. In other embodiments a particular token instance can only be loaded into a single strong authentication token.

In some embodiments when a particular instance is allocated to a particular user, the instance or at least part of the instance data is associated with that user by the application and the application may store that association in a data base. For example upon instance allocation an application may store in a data base a relation that links the particular user to which the instance has been allocated to data that may allow the application to retrieve or determine one or more cryptographic credential verification keys that the application may use to verify dynamic credentials that a token comprising that instance may generate for that instance.

In some embodiments an application has a pool of non-allocated instances (i.e. instances that have not (yet) been allocated to a particular user) and may select an instance from this pool and allocate it to a user when an instance needs to be allocated to that user. In some embodiments these non-allocated instances may all have been generated by an instance provider which may provide a batch of non-allocated instances to an application owner. In some embodiments the party that acts as instance provider may also be the party responsible for manufacturing the tokens. In other embodiments when an instance needs to be allocated to a user, an application may generate a new instance to be allocated to that user.

Loading Instances into a Token

In some embodiments instances may be loaded in a token as part of the manufacturing of a token. In some embodiments instances may be loaded into a token after the token has been manufactured and distributed to a user.

In some embodiments loading an instance into a token may involve providing one or more instance loading messages or commands to the token. In some embodiments such an instance loading message or command may be manually entered by the user into the token using a manual user input interface of the token such as for example a keyboard. In some embodiments an instance loading message or command may comprise a digital message or command that may be provided to the token by means of a digital data input interface of the token. For example in some embodiments an instance loading message or command may be encoded into a two-dimensional barcode which may be captured by a digital camera comprised in the token and which may be subsequently be decoded by the token.

In some embodiments an instance loading message or command may be cryptographically protected. In some embodiments an instance loading message or command may be protected using a cryptographic algorithm and a cryptographic instance loading key. For example in some embodiments an instance loading message or command may be encrypted (in whole or in part) using an encryption algorithm parameterized with a cryptographic instance loading key. In some embodiments a token may be adapted to decrypt encrypted contents comprised in an instance loading message or command using a decryption algorithm parameterized with a cryptographic instance loading key. In some embodiments an instance loading message or command may comprise a Message Authentication Code (MAC) or a signature over at least a part of the content of the message or command to authenticate the origin of the instance loading message or command. In some embodiments a token may be adapted to verify a MAC or signature comprised in an instance loading message or command using a cryptographic algorithm parameterized with a cryptographic instance loading key. In some embodiments a cryptographic algorithm used to secure an instance loading message or command may comprise a symmetric cryptographic algorithm, such as a symmetric encryption/decryption algorithm such as DES (Data Encryption Standard) or AES (Advanced Encryption Standard), or a keyed-hashing algorithm such as HMAC (Hash-based Message Authentication Code). For example in some embodiments a symmetric encryption/decryption algorithm may be used to encrypt/decrypt an instance loading message or command. In some embodiments a symmetric encryption algorithm may be used to generate and/or verify a MAC. In some embodiments a keyed-hashing algorithm may be used to generate and/or verify a MAC.

In some embodiments a cryptographic instance loading key may be shared between the token into which the instance should be loaded and the application issuing the instance loading message or command. In some embodiments an instance loading key may be associated with a single token. In some embodiments an instance loading key may be associated with a batch of tokens and may be shared by all tokens of the same batch.

In some embodiments a device may only support a certain maximum number of instances. When the maximum number of instances have been loaded and a user attempts to load an extra instance, the token may inform the user that the maximum number of loaded instances has been reached and may propose the user to remove one of the loaded instances to make room for another instance.

Multi-Application Support

In some embodiments loading of instances may be under control of a token controlling party and loading of an instance may require approval and/or cooperation of the token controlling party. In some embodiments the token controlling party coincides with an application provider and only instances related to the application or applications provided by that application provider can be loaded into the token. In some embodiments a token controlling party may allow the loading of instances related to different application providers. For example in some embodiments a token controlling party may provide to a number of application providers the tools and cryptographic keys to load and manage instances related to their applications. In some embodiments the values of cryptographic keys that an application provider may use to load and manage instances related to that application provider are different from the values of the corresponding keys used by other application providers.

Removing Instances

In some embodiments a token may be adapted to support the possibility to remove instances that are no longer needed or that have become obsolete (for example an instance that has been locked and that can no longer be unlocked).

In some embodiments the removal of an instance on the token may be initiated by the token receiving an instance removal message or command. In some embodiments the removal of an instance on the token may be initiated by the user manually selecting on the token (e.g. via a menu offered by the token) an instance to be removed.

In some embodiments an instance can only be removed after the token has verified the identity of a user. In some embodiments an instance can only be removed after the token has verified the identity of the user associated with that instance. In some embodiments a master user (which for example may be the first user to which an instance on the token has been allocated) may be associated with the token and after the token has verified the identity of the master user the token may allow the removal also of instances associated with other users.

In some embodiments the removal of an instance doesn't require the verification of the identity of a user.

In some embodiments the removal of an instance requires that the token receives an instance removal message or command that targets the instance to be removed. In some embodiments such an instance removal message or command is cryptographically secured. For example in some embodiments the token may be adapted to cryptographically verify that the instance removal message or command has been generated or issued by an application that is entitled to instruct the token to remove an instance. For example in some embodiments an instance removal message may be encrypted or may comprise a Message Authentication Code. In some embodiments the application may use a cryptographic algorithm to secure an instance removal message with a first cryptographic instance removal key. In some embodiments the token may verify an instance removal message using a cryptographic algorithm with a second cryptographic instance removal key. In some embodiments the application and the token may share a cryptographic instance removal key. In some embodiments a cryptographic instance removal key may be associated with the token. In some embodiments a cryptographic instance removal key may be associated with an instance.

In some embodiments a token may support the possibility to remove all instances of the token at once. For example in some embodiments the token may support a general instance removal message or command to remove all instances. In some embodiments such a general instance removal message or command may be cryptographically protected using a cryptographic general instance removal key that may be associated with the token and that may be shared with the application issuing or generating the general instance removal message or command.

In some embodiments the token may be adapted to automatically remove an instance that is locked (see elsewhere in this description for more information on locking instances).

Selecting a Particular Instance

When a user for example wants to generate an authentication credential (such as a one-time password or a transaction data signature) using a strong authentication token comprising more than one token instance, then somehow the correct instance associated with the user with which the credential has to be generated must be selected. Also for other operations that involve a particular instance (such as unblocking a locked PIN or password of a particular instance, or changing the PIN or password of a particular instance, or removing an obsolete particular instance) it may be necessary that the correct instance that is the target of the operation is selected. In some embodiments if the token only comprises a single instance then the token may automatically select that single instance.

Manual Selection

In some embodiments the strong authentication token may comprise a mechanism allowing a user to explicitly select a particular instance. For example in some embodiments the strong authentication token may provide a mechanism, such as a listbox or a menu, that presents the user (e.g., via a token display) a list of instance identifiers and that allows the user to select (e.g., via a token user input device) one of the presented instance identifiers whereby each of the presented instance identifiers may be associated with one of the instances present on the strong authentication token and whereby the user selecting a particular instance identifier may have the effect of selecting the instance associated with that particular instance identifier. In some embodiments an instance may comprise an instance identifier.

Automatic Selection

In some embodiments token operations or token functions involving a particular instance may be initiated by various token commands. In some embodiments these token commands may be embedded in token messages that may be provided to the token. In some embodiments messages or commands may be constructed and authentication tokens may be adapted such that an authentication token receiving a message or command may deduce the target instance of the received message or command from the contents of the message or command.

Automatic Explicit Selection

In some embodiments a token command or a token message embedding a token command may comprise a data element that allows the token to determine the particular instance targeted by the command or message. For example in some embodiments a token message or token command targeting a particular instance may comprise an instance identifying data element that may match an instance identifier of the targeted instance. Upon receiving the token message or token command the token may retrieve the instance identifying data element from the message or command and compare it to the instance identifiers of the instances present in the token. If the token finds a match between the retrieved instance identifying data element of the message or command, the token may select the instance associated with the matching instance identifier and act upon the selected instance according to the contents of the message or command. In some embodiments the instance identifying data element is unique over all token instances in the system. In some embodiments the instance identifying data element is only unique over all token instances in a single token. For example in some embodiments the identifying data element used to identify and select the instance of a particular token that is targeted by a command or message may be shared by all instances associated with the same user, but any token may comprise not more than one instance associated with the same user.

Automatic Implicit Selection

In some embodiments the received message or command may have been cryptographically protected and the processing of the message or command may require that the token carries out a cryptographic operation using a cryptographic message key associated with the target instance of the message or command. In some embodiments the token may retrieve the cryptographic message key that is associated with a particular instance from that particular instance. In other embodiments the token may determine or derive the cryptographic message key associated with a particular instance from data retrieved from or otherwise associated with that instance. In some embodiments the authentication token may be adapted to verify whether the cryptographic operation was successful. For example in some embodiments at least a part of the content of the message may have been encrypted (e.g. by the application) with the cryptographic message key of the target instance and the cryptographic operation mentioned above may comprise the token decrypting the encrypted content with the cryptographic message key associated with a particular instance. The token may then verify whether the decrypted content satisfies some pre-determined condition. For example the token may verify whether the decrypted content obeys certain syntax rules or whether certain data fields are present or whether the values of certain data fields are correct. For example the token may verify whether the decrypted content comprises a Cyclical Redundancy Code (CRC) and whether the value of that CRC corresponds to the rest of the decrypted content. If the token determines that the decrypted content indeed satisfies the pre-determined conditions, then the token may consider the cryptographic operation successful. In other embodiments the message or command may comprise a Message Authentication Code (MAC) that may have been generated using a cryptographic message key of the target instance with techniques well-known in the art to generate a MAC, and the token may be adapted to verify this MAC using the cryptographic message key of a particular instance with complementary techniques well-known in the art to verify a MAC.

In some embodiments there is a high statistical probability that the cryptographic operation will not be successful if it is carried out with another value for the cryptographic message key than the value that is associated with the target instance of the message or command. In some embodiments the authentication token may, upon receipt of the message or command, perform the cryptographic operations with the cryptographic message keys associated with the various instances comprised in the token. If the cryptographic operation is successful using the cryptographic message key of a particular instance then the token may conclude that this is the target instance of the message or command and the token may select that instance and may perform or initiate the function or operation associated with the message or command. In some embodiments if the cryptographic operation fails with the cryptographic message keys of all instances then the token may present the user with an error message.

Key Management

In some embodiments a token may comprise and/or use various cryptographic keys with various cryptographic algorithms. For example a token may use a first cryptographic key to generate authentication credentials on behalf of a particular user, or may use a second cryptographic key to secure the loading of an instance, or may use a third cryptographic key to secure unlocking a locked instance, or may use a fourth cryptographic key to secure a message targeted to a particular instance, or may use a fifth cryptographic key to generate or derive another cryptographic key.

Keys Associated with a Batch of Tokens

In some embodiments some cryptographic keys that may be used by a token may have the same value for all tokens of a batch of tokens. For example in some embodiments all tokens of a batch of tokens may share the same value of a master key that the tokens may use to derive other keys.

Keys Associated with a Particular Token

In some embodiments some of the cryptographic keys that are used by a token may be associated with a particular token i.e. each token has its own value for such a key and this value may be unique. In some embodiments this value may be unique in an absolute sense i.e. any particular value for any particular key can only occur in one single token. For example in some embodiments the values of some cryptographic keys may be generated by encrypting a unique token serial number with a secret master key. In other embodiments this value may be unique only in a statistical sense i.e. knowledge of the value of a particular key in one token does not increase the practical chances of being able to obtain the value of that key in another token. For example in some embodiments the values for some cryptographic keys may be generated by a true random generator.

Keys Associated with Particular Instances

In some embodiments some of the cryptographic keys that are used by a token may be associated with a particular instance comprised in the token i.e. each instance has its own value for such a key and this value may be unique in an absolute or statistical sense. In some embodiments these instance keys are unique except that more than one copy of the same instance may exist in different tokens and that these more than one copies may share the same value for the key associated with the instance. In some embodiments these instance keys are unique except that the same value of an instance key may be shared by more than one instances that are all associated with the same user. In some embodiments the keys associated with particular instances may comprise one or more credential generation keys, and/or an unlock key, and/or one or more secure messaging keys. In some embodiments at least some of the various keys associated with a particular instance may be stored as part of the instance data. In some embodiments at least some of the various keys associated with a particular instance may be determined or derived by the token using data stored in or associated with the particular instance. For example in some embodiments one or more keys associated with a particular instance may be derived by the token from a master key associated with the token and a data element associated with the instance (that may be stored in the instance) such as for example an instance identifier or instance identifying data element.

In other embodiments one or more keys associated with a particular instance may be derived by the token from a master instance key associated with that particular instance (and which may be stored in the instance or which in turn may be derived from e.g. a token master key) and a diversification value such as for example a key type indicator value.

Token or Instance Messages or Commands

In some embodiments a token may be adapted to receive and process messages or commands. In some embodiments some messages or commands may be directed or targeted to the token as a whole (such as for example a message to load an extra instance). In some embodiments some messages or commands may be directed or targeted to a particular instance comprised in the token (such as for example messages or commands to unlock a locked instance or messages or commands to initiate the generation of a dynamic credential with a particular instance).

Securing Messages or Commands

In some embodiments some messages or commands may be cryptographically protected. In some embodiments some messages or commands may be cryptographically protected to protect the confidentiality of data comprised in the messages or commands. In some embodiments some messages or commands may be cryptographically protected to secure the integrity of the messages or commands. In some embodiments some messages or commands may be cryptographically protected to demonstrate the authenticity of the messages or commands. In some embodiments at least some of the contents of some messages or commands may be encrypted e.g. to provide confidentiality of sensitive data contained in the messages or commands and a token may be adapted to decrypt the encrypted content. In some embodiments a token may be adapted to authenticate the origin of some messages or commands. For example in some embodiments some messages or commands may comprise a signature or a MAC and the token may be adapted to verify the signature or MAC.

In some embodiments some messages or commands may be cryptographically protected using symmetric cryptographic algorithms. In some embodiments these symmetric cryptographic algorithms may use symmetric cryptographic keys. In some embodiments the cryptographic keys used to protect the messages or commands may be derived from a secret that is unique for a particular instance. In some embodiments the cryptographic keys used to protect the messages or commands may be derived from a secret that is unique for a particular token. In some embodiments the cryptographic keys used to protect the messages or commands may be derived from a secret that is shared among all the instances of a particular group of instances (such a group may for example comprise only instances associated with the same user) and that is unknown to instances not belonging to that particular group. In some embodiments the cryptographic keys used to protect the messages or commands may be derived from a secret that is shared among all the instances or among all the instances of a batch of instances (for example all the instances associated with a particular application).

Types of Messages or Commands

In some embodiments there may be multiple types of messages or commands serving various purposes. In some embodiments messages or commands may comprise a data element indicating the type, function or purpose of the message or command.

Some messages or commands may be used to load an instance into a token. Some messages or commands may be used to unlock a locked instance. Some messages or commands may be used to remove an instance. Some messages or commands may be used to initiate the generation of a dynamic credential.

Providing Messages or Commands to a Token

In some embodiments some messages or commands may be provided to the token manually by the user (e.g. by the user entering for example on the keyboard of the token a string of characters encoding the message or command). In some embodiments messages or commands may be encoded in a digital format and the digital message or command may be provided to the token by means of a digital data input interface of the token. In some embodiments the digital data input interface to provide the messages or commands to the token may support bi-directional communication. For example the digital data input interface may comprise a wired data communication interface such as USB (Universal Serial Bus), or the digital data input interface may comprise a wireless data communication interface such as Bluetooth. In other embodiments the digital data input interface to provide the messages or commands to the token may support only uni-directional communication towards the token. For example in some embodiments the token may comprise a digital camera for capturing digital images and the message or command may be encoded as an image (for example in the form of a two-dimensional barcode such as a QR-code) and the token may be adapted to capture images encoded with messages or commands and may be adapted to decode these images to retrieve the messages or commands.

Determining the Target of the Message

In some embodiments a user may assist the token in determining the target of a message or command. For example in some embodiments a user may manually select a target instance (before or after the receipt of the message or command).

In some embodiments a token may be adapted to autonomously and determine the target of a received message or command. In some embodiments a message or command may comprise a data element that explicitly indicates the intended target of the message or command. For example in some embodiments a message or command may comprise a target identifying data element such as a token serial number and/or an instance serial number. In some embodiments the target of a message or command may be indicated in an implicit way. For example in some embodiments a message or command may be cryptographically secured and the token may be adapted to perform a cryptographic verification of the received message of command by applying a cryptographic algorithm that may be parameterized with a cryptographic verification key that may be associated with a candidate target for the message. In some embodiments the verification is expected to succeed if the token performs the verification using a value of the verification key that corresponds to the intended target and the verification is expected to fail if the token performs the verification using another value of the verification key. In some embodiments the token may determine the target of the message or command by making a list of candidate targets and performing the cryptographic verification of the received message or command using one after the other the different verification key values corresponding to the respective candidate targets. If the token finds that for a particular candidate target the verification is successful, then the token may conclude that this candidate target is the intended target of the message or command. If verification fails for all candidate targets, the token may reject the message or command and generate an error condition.

Reserving the Use of an Instance to its Legitimate User

In some embodiments the strong authentication token may be adapted to ensure that only the legitimate user associated with a particular instance can effectively use that particular instance.

To ensure that only the legitimate user associated with a particular instance can use that particular instance to generate authentication credentials, strong authentication tokens may be adapted to verify a user when a user attempts to make use of a particular instance, more in particular strong authentication tokens may be adapted to verify whether a user attempting to make use of a particular instance corresponds to the user that is associated with that particular instance.

In some embodiments the token may prompt the user to present some kind of user credential and the targeted instance (i.e. the instance that the user is attempting to use) may comprise some user credential reference data that the strong authentication token may compare with the user credential provided by the user. If the comparison between the provided user credential and the instance user credential reference data yields a match then the token may grant the user access to the instance, otherwise the token may refuse the user access to the instance. For example, in some embodiments a strong authentication token may prompt a user to enter a PIN or password value and may compare that entered PIN or password value with a PIN or password reference value (which may for example comprise the correct value for the PIN or password or a hash value of that correct value) comprised in the instance data of the instance the user wants to use. In other embodiments a strong authentication token may have for example a fingerprint sensor and may be adapted to capture a fingerprint reading and compare the captured fingerprint reading with a set of biometric fingerprint reference data comprised in the targeted instance.

PIN Management

Initializing PIN or Password or Biometric Reference Data

In some embodiments the reference data that an authentication token uses to verify a user of a particular instance is loaded into the token as part of the other instance data.

In some embodiments a new instance initially doesn't comprise the reference data for user verification. Instead, in some embodiments the user of a particular instance may be prompted during first usage of the instance to provide the value of the PIN or password at least once that the user will henceforth use in user verification and the token may store a reference value related to the value or values provided by the user for the token to use in subsequent user verifications. In some embodiments the user of a particular instance may have to go through a biometric enrolment phase during which the token obtains one or more captures of a certain biometric (such as a fingerprint) of the user and constructs biometric reference data from these biometric captures that the token may use in subsequent user verifications for this instance.

In some embodiments a new instance is initially protected by an initial value of the user verification reference data (which may be loaded together with or as part of the other instance data) and the token may be adapted to prompt the user to provide new user verification reference data for that instance after the first successful user verification on the basis of these initial user verification data. In some embodiments whether the token must prompt the user to provide new user verification reference data for a particular instance upon first usage of that instance may be indicated by a data element in the instance such as a 'First-use-modify' flag. In some embodiments obtaining the new user verification reference data may happen in the same way as explained above for instances that initially don't have user verification reference data. For example, in some embodiments when a new instance is loaded into an authentication token, the instance data being loaded comprise the reference data for an initial value for a PIN or password and a flag that indicates that the PIN or password still has its initial value. When the user wants the use that instance for the first time, the token first verifies the user using the initial PIN or password reference data and after the user has been successfully verified the token may prompt the user to provide a new PIN or password value. The token may also prompt the user to provide this new PIN or password value a second time as a confirmation. The token may then replace the initial reference value with the reference value for the new PIN or password.

PIN or Password Change

In some embodiments an authentication token may allow the user of a particular instance to change the PIN or password of that instance. For example in some embodiments a token may have a function that allows the user to provide a new PIN or password value after successful user verification. In some embodiments the token may require the user to provide the same value of the new PIN of password more than once in order to be accepted.

Locally Initiated PIN Change

In some embodiments a PIN Change for a particular instance can be initiated locally on the authentication token. For example in some embodiments an authentication token may provide a menu option to initiate a PIN Change. In some embodiments a user must first select the instance for which the PIN or password must be changed and then the user can select the PIN Change function. In some embodiments the token may verify the user for the selected instance before the user can select the PIN Change function. In some embodiments the token may verify the user for the selected instance after the PIN Change function has been selected (e.g. as part of the PIN change function). In other embodiments the user must first select the PIN Change function and then the instance for which the PIN or password should be changed.

Application Initiated PIN Change

In some embodiments a user wanting to change the PIN or password of a particular instance may interact with an application and indicate to the application his or her wish to change the PIN or password. In some embodiments the application may then construct a PIN Change command or message which may then be transferred to the token to initiate the PIN Change function. In some embodiments the PIN Change command or message may also be used by the token to determine and select the instance for which the PIN or password should be changed, as is explained more generally and in more detail elsewhere in this description. In some embodiments an application may require that the user be successfully authenticated to the application prior to making a PIN Change message or command available. For example the application may require the user to provide a credential generated with the instance for which the user wishes to change the PIN or password (which in some embodiments may imply that the user has been successfully verified by the token for that instance). In some embodiments the PIN Change command or message may implicitly or explicitly indicate to the token that the user has been successfully authenticated to the application and the token may no longer require an additional user verification of the user for the target instance.

Locking the PIN or Password of a Particular Instance.

In some embodiments an authentication token may disable the user verification mechanism for one or more instances and lock these instances. In some embodiments this may happen after certain conditions are fulfilled. For example in some embodiments an authentication token may disable user verification for a particular instance and block access to the instance after the number of consecutive failed user verifications has exceeded a certain threshold. For example in some embodiments the authentication token may disable PIN or password verification for a particular instance and may block access to that instance as soon as three wrong PIN or password values have been entered consecutively.

In some embodiments an authentication token may automatically remove an instance when the PIN or password or other user verification mechanism is locked. In some embodiments when an instance is locked and removed, a new instance may be generated and loaded into the token to replace the removed instance.

Unlocking the PIN or Password of a Particular Instance

In some embodiments an authentication token may have an unlock mechanism to unlock a particular locked instance. In some embodiments when a particular locked instance is unlocked, the user may use the old PIN or password of that instance again. In other embodiments when a particular locked instance is unlocked, the user is required to provide a new value for the PIN or password for that instance and the token will replace the old user verification reference data of that instance with new user verification reference data corresponding to that new value.

Locally Initiated Unlock

In some embodiments an Unlock operation for a particular instance can be initiated locally on the authentication token. For example in some embodiments an authentication token may provide a menu option to initiate an Unlock operation. In some embodiments the user must first select the instance that the user wishes to unlock and then the user can select the Unlock function. In other embodiments the user must first select the Unlock function and then the instance that should be unlocked. In some embodiments if the token comprises only one locked instance then the instance is automatically selected when the user selects the Unlock function.

Application Initiated Unlock

In some embodiments a user wanting to unlock a particular locked instance may interact with an application and indicate to the application his or her wish to unlock an instance. In some embodiments the application may then (possibly after some conditions have been fulfilled) construct an Unlock command or message which may then be transferred to the token to initiate the Unlock function. In some embodiments the Unlock command or message may also be used by the token to determine and select the instance to unlock, as is explained more generally and in more detail elsewhere in this description. In some embodiments an application may require that the user be successfully authenticated to the application prior to making an Unlock command available. For example the application may require the user to authenticate by means of an alternative authentication method than by using the locked instance of the authentication token. For example in some embodiments the user may have to go to a bank branch and authenticate physically using identity documents after which the user may receive an Unlock command for the locked instance. In some embodiments the Unlock command or message may implicitly or explicitly indicate to the token that the user has been successfully authenticated to the application and the token may unlock the target locked instance without requiring an additional user verification of the user for the target instance.

PUK

In some embodiments an instance may comprise a reference value for a PUK (PIN Unblock Code). When the instance is locked, the user may provide the value of the PUK. The token may then compare the PUK value provided by the user with the PUK reference value stored in the instance and if there is a match the token may unlock the instance. In some embodiments a PUK value of a particular instance can only be used once to unlock that particular instance. If the instance thereafter is locked again, that PUK value cannot be used a second time to unlock the instance again. In some embodiments an instance may have multiple PUKs whereby the different PUKs may be used one after the other.

Application-Generated Unlock Code

In some embodiments an application may generate an Unlock Code for a locked instance. When such an Application-generated Unlock Code is delivered to the token, the token may verify the Application-generated Unlock Code. In some embodiments the application may generate the Application-generated Unlock Code using a cryptographic algorithm parameterized with a cryptographic key. In some embodiments the token may verify the Application-generated Unlock Code using a cryptographic algorithm parameterized with a cryptographic key that the token may retrieve from the instance or that the token may determine or derive using data from the instance. For example in some embodiments a locked instance may generate an unlock challenge value. The token may present the unlock challenge to the user. The token may present the unlock challenge for example when the instance gets locked or whenever the locked instance is selected. In some embodiments the token may present to the user other data along with the unlock challenge such as for example a message inviting the user the contact the application's helpdesk, and/or an instance identifying data element (e.g. an instance serial number), and/or a token identifying data element (e.g. a token serial number). The user may provide the unlock challenge value to an application. The application may determine whether the user is the legitimate user associated with the locked instance (e.g. by means of some alternative authentication method) and may determine whether the locked instance may be unlocked. The application may then generate an unlock response by cryptographically combining the unlock challenge with a first cryptographic unlock key. The generated unlock response may then be provided to the token. The token may verify the unlock response by using a cryptographic algorithm that operates on the unlock challenge and the unlock response and that is parameterized with a cryptographic unlock instance key that the token may retrieve from the instance or may derive from data that it retrieves from the instance.

For example in some embodiments to generate the unlock response the application may encrypt the challenge using a cryptographic encryption algorithm parameterized with an unlock encryption key, or the application may generate a hash of a combination of the challenge and an unlock secret. In case the unlock response was generated by the application encrypting the challenge provided by the user with the first cryptographic unlock key, the token may verify the unlock response by decrypting the unlock response with the instance's copy of the cryptographic unlock key and may compare the result of the decryption with the original challenge value (which may for example have been stored in the instance) and may unlock the instance if there is a match. If on the other hand the unlock response has been generated by the application hashing a combination of the challenge provided by the user and the first cryptographic unlock key, the token may verify the unlock response by hashing a combination of the original challenge and the instance's copy of the cryptographic unlock key and may compare the resulting hash with the received unlock response and may unlock the instance if there is a match.

For example in some embodiments an instance may comprise a cryptographic key that may be used as a cryptographic unlock instance key and that may be shared with an unlock application. This key may be shared with a server-based unlock application. When the instance gets locked because a user has entered a wrong PIN or password too many times in a row, the token may generate a random or pseudo-random value and store that value as the unlock challenge in the instance. Whenever the instance is selected or an attempt to initiate an action involving the instance is made, the token may inform the user that this instance is locked and may present the user with the unlock challenge (e.g. in the form of a string of characters or digits whereby the characters or digits may for example by alphanumerical or decimal). The user may then contact the unlock application. After the unlock application has verified that all conditions are fulfilled to allow the unlocking of the instance (which may include authenticating the user in some alternative way), the application may generate an unlock response code (for example as explained above) and an unlock message comprising the generated unlock response code. The unlock message may then be provided to the token. The token may then select the locked instance targeted by the unlock message. The token may then verify the unlock response code comprised in the unlock message. Upon successfully verifying the unlock response code, the token may unlock the locked instance.

Re-Loading a Locked Instance

In some embodiments a locked instance may be unlocked by re-loading the locked instance. In some embodiments the re-loaded instance may be identical to the originally loaded instance. In other embodiments some data elements of the re-loaded instance may have different values than the corresponding values in the originally loaded instance (for example values of secrets that may be used to generate dynamic credentials or the initial values of user verification reference data).

Generating Dynamic Credentials

Tokens may be adapted to generate dynamic credentials by cryptographically combining a dynamic variable with a cryptographic secret. In some embodiments a token may be adapted to generate dynamic credentials by cryptographically combining a dynamic variable with a cryptographic secret comprising one or more credential generation keys that are associated with an instance loaded into the token. In some embodiments the credential generation keys may be stored in the instance. In some embodiments the token determines the values of the credential generation keys by using data stored in the instance. The dynamic variable may comprise a value internally generated by the token such as for example the value of a real-time clock, or the value of a counter stored in the instance and automatically incremented (or decremented) by the token each time a dynamic credential is generated using the value of that counter, or the value of a dynamic credential previously generated by the token for that instance and stored in the instance. The dynamic variable may also comprise an externally generated value that is received by the token, such as a challenge generated by an application server or transaction data that needs to be signed and that have been provided to the token. A dynamic variable may also comprise any combination of internally and externally generated values. For example, in order to prevent replay attacks against transaction data signatures, a token may use a dynamic variable that comprises the combination of transaction data and a time value provided by a clock of the token. In case the token only uses internally generated values for the dynamic variable the dynamic variable may be referred to as an internal dynamic variable and the generated dynamic credential may be referred to as a 'one-time password'. In case the token uses a dynamic variable that comprises an externally generated challenge, the generated dynamic variable may be referred to as a 'response'. In case the token uses a dynamic variable that comprises transaction data, the generated dynamic credential may be referred to as a 'transaction data signature' or just shortly as a 'signature'.

In some embodiments the token may be adapted to present the generated dynamic credential to the user. In some embodiments the user may forward the presented dynamic credential to a server for verification. In some embodiments the token may present the dynamic credential to the user in a visual way (e.g. by using a display). In some embodiments the token may present the dynamic credential to the user in an acoustical way (e.g. by using a loudspeaker). In some embodiments the presented dynamic credential may be encoded in the format of a string of characters. In some embodiments the string may only comprise decimal characters. In some embodiments the string may comprise alphanumerical characters. In some embodiments the string may comprise characters from a non-alphabetical writing system (such as for example Chinese characters).

Methods for Authenticating Users or Transactions Using Multi-Instance Tokens

In one aspect of the invention a system for authenticating users or transactions or for securing interaction between a plurality of users and one or more applications is provided.

In some embodiments a method according to the invention may comprise the following steps.

Distributing among a plurality of users a plurality of tokens as described in more detail elsewhere in this description.

Associating with at least one of these users at least one instance.

Loading, as described in more detail elsewhere in this description, the instance in at least one token.

Generating at the token, as described in more detail elsewhere in this description, a dynamic credential for the loaded instance.

Receiving at an application the generated dynamic credential.

Verifying the validity of the received dynamic credential.

Taking at an application appropriate action depending on the outcome of the verifying step.

Systems for Authenticating Users or Transactions by Means of Multi-Instance Tokens In one aspect of the invention a system for authenticating users or transactions or for securing interaction between a plurality of users and one or more applications is provided.

In one embodiment a system according to the invention may comprise the following components.

One or more application server computers. The one or more application server computers may host one or more applications which may be remotely accessible by a plurality of users. An application server computer may for example comprise a web server. The one or more applications may be under control of one or more application providers.

A plurality of client computing devices that may allow one or more users of the plurality of users to remotely access the one or more applications. A client computing device may for example comprise a PC (personal computer), tablet computer, or smartphone.

A computer network that connects the one or more application server computers and the plurality of client computing devices. In some embodiments the computer network may comprise the internet. In some embodiments the computer network may comprise a public telephone network. In some embodiments the computer network may comprise a wireless telephony network.

A plurality of tokens as described in more detail elsewhere in this description. The tokens may be distributed among the plurality of users. In some embodiments the tokens may be distributed among the users by the one or more application providers.

One or more credential verification servers. In some embodiments each of the one or more credential verification servers is connected to at least one of the one or more application servers and may be configured to verify dynamic credentials that an application hosted by the one or more application servers connected to the verification server may receive from users interacting with such application. In some embodiments each of the application servers may be connected to at least one of the one or more credential verification servers and may be configured to forward to one of the connected one or more credential verification servers dynamic credentials received by an application it hosts from a user interacting with the application. Upon receiving a dynamic credential from an application, a credential verification server may retrieve data associated with the instance for which the dynamic credential has been generated by a token and use that data to cryptographically verify the validity of the received dynamic credential. The credential verification server may return a signal to the application to indicate whether the verification was successful. If the signal indicates that the verification was successful the application may use that information in deciding whether or not to grant access to the user (for example to certain data) or whether or not to perform a certain operation requested by the user.

Example Embodiments

In the following paragraphs a set of example embodiments of the invention will be described.

In the following set of example embodiments a plurality of authentication tokens are provided by a token manufacturer to a group of application owners. The application owners may distribute tokens among their users. In other embodiments the tokens may be distributed (directly or indirectly) to the users by the token provider. These users may use a token to securely access applications provided by the various application providers. For example, a user may remotely access an application by interacting with a local client computing device which may be under control of the user (such as a PC, laptop, tablet or smartphone) and the local computing device may be remotely communicating, e.g. over a computer network such as the internet, with a server computer hosting an application that is being accessed by the user. For example, a user may use a web browser application on his or her local computing device to interact with a web-based internet banking application hosted by a remote webserver. To secure a user's access of and interaction with the applications, a user may use a token that was distributed by one of the application owners. While accessing an application a user may use the token to generate dynamic credentials that the user forwards, e.g. via the local computing device, to the application server for verification. Upon successful verification of the dynamic credential the application server may grant the access or may execute the operation requested by the user. For example the user may use the token to generate a one-time password when logging in to an internet banking application to review an account balance. The user may also use the token to generate a signature over the data of a money transfer that the user wants to carry out via the internet banking application.

In some embodiments the tokens and application verification servers may have been adapted so that: a single token can be used by multiple users, a user can use the same token to access multiple applications even if they are provided by different application providers without the different application providers having to share secrets or otherwise having to trust each other, and a user can use multiple tokens to access the same application. This has the following advantages: the total cost for the application providers to secure their application is reduced since an important part of the infrastructure (i.e. the tokens) can be shared among multiple users and multiple application owners, there is an increased user convenience (i.e. increased flexibility for the user) since a user can use multiple devices to access the same application and can use the same device to access multiple applications, and in spite of this cost reduction and increased user convenience the level of security offered by the system is as high as with conventional security systems based on conventional strong authentication tokens.

More specifically the tokens may have been adapted to support multiple instances whereby the different instances comprised in the same device may be associated with different users and/or different applications and whereby multiple instances associated with the same user and the same application may be comprised in different devices. In some specific embodiments instances may be grouped in user instance groups whereby all instances of the same instance user group are allocated to the same user and are associated with the same application, and whereby at least one instance user group is associated with each user. In such embodiments the system may be adapted to ensure that a single device cannot comprise multiple instances of the same user instance group.

In some embodiments the tokens may be grouped in more than one batch. In some embodiments each batch may group all tokens of a certain type. For example in some embodiments there may be two batches of tokens. One batch may comprise all dedicated hardware tokens (i.e. electronic devices specifically designed and manufactured to function as the tokens described in this description), while another batch may comprise all software tokens (i.e. software applications running on general purpose computing platforms that have not been specifically designed to function like tokens and whose primary usage may be different than performing the functions of a strong authentication token, for example smart phones running an authentication app). In other embodiments there may be multiple token providers and each batch may group all tokens of the same token provider.

In some embodiments each token may have a unique token identifier, henceforth referred to as Device ID. In some embodiments the Device ID implicitly or explicitly indicates the batch the token belongs to. Each user instance group may have a unique user instance group identifier henceforth referred to as Group Serial Number. Each instance may have a unique instance identifier henceforth referred to as Instance ID. In some embodiments the Instance ID may consist of a combination of the Group Serial Number of the user instance group the instance belongs to and a sequence number that is unique within the user instance group.

The system may use the following cryptographic keys:

Batch Master Keys

With each different token batch a different secret batch master key may be associated. In some embodiments these batch master keys may be generated by the token provider and the token provider may load the appropriate batch master key in the tokens of the batch that the batch master key is associated with before the token provider provides the tokens to the application providers or the users. In some embodiments each batch master key may be known only to the token provider and the tokens of the batch that the batch master key is associated with. In some embodiments there are at least two different token batches with a different batch master key.

User Instance Group Master Key

With each user instance group a secret user instance group master key may be associated. The user instance group master key may be used to secure the loading of instances of the user instance group into tokens, as is explained in more detail elsewhere in this description.

Instance Payload Keys

With each instance a set of one or more secret payload keys may be associated. These payload keys will be used to secure at least some messages and commands that will be exchanged between an application server the instance is associated with and a token comprising the instance. In some embodiments the payload keys of an instance may be shared secrets that are shared between an instance they are associated with and a server and they may be used to parametrize symmetric cryptographic algorithms for securing messages. In some embodiments all instances of the same user instance group share the same values for the payload keys such that a server can generate cryptographically protected messages that may nevertheless be received by all instances of the same user instance group. This in turn has the advantage that it is sufficient for a user to identify to the application him- or herself and that the user doesn't have to identify to the application the token he or she intends to use before receiving a server message that may initiate a token operation such as the generation of dynamic credential for the application. In some embodiments any token can comprise at most one token instance of the same user instance group. In some embodiments instances may have more than one different payload keys whereby the different payload keys may be used for different purposes. For example, one payload key may be used to ensure confidentiality of messages (e.g. by encrypting or decrypting messages) while another payload key may be used to ensure authentication and/or integrity of messages (e.g. by generating or verifying signatures of MACs over messages).

In some embodiments the instance data stored in a token may comprise the actual values of the payload keys. In some embodiments the instance data stored in a token may comprise the values of data elements that the token may use to determine the values of the payload keys of that instance when the token needs those values of the payload keys.

Instance Credential Generation Keys

With each instance a set of one or more secret credential generation keys may be associated. These secret credential generation keys may be used by the token to generate dynamic credentials for the instance they are associated with. In some embodiments the secret credential generation keys of an instance may be shared secrets that are shared between the an instance they are associated with and a server (such as an application server or credential verification server) and they may be used to parametrize a symmetric cryptographic algorithm for generating dynamic credentials. In some embodiments the credential generation keys are the same for more than one instance of the same user instance group. In some embodiments they have the same value for all instances of the same user instance group. In some embodiments these credential generation keys are unique for each instance in order to increase the security (i.e. such that if one instance of a user instance group gets compromised the other instances of the same user instance group are not automatically also compromised). In some embodiments these credential generation keys are only known to the instance or instances they are associated with and the application server the instances are associated with. In some embodiments an instance may have more than one different credential generation keys whereby the different credential generation keys may be used to for different purposes. For example in some embodiments different credential generation keys may be used to generate different types of credentials. For example in some embodiments one credential generation key may be used to generate one-time passwords (e.g. to authenticate a user attempting to login) while another credential generation key may be used to generate a signature (e.g. to authenticate a transaction submitted by a user).

In some embodiments the instance data stored in a token may comprise the actual values of the credential generation keys. In some embodiments the instance data stored in a token may comprise the values of data elements that the token may use to determine the values of the credential generation keys of that instance when the token needs those values of the credential generation keys.

Loading Instances

In some embodiments instances may be loaded into tokens by means of the following two-stage process.

First Stage of Instance Loading Process

In a first stage a first user instance group loading message (or first loading message or first stage loading message) is generated for a particular user instance group. This first loading message may be used to load all the instances of this particular user instance group. This message may comprise sufficient data for the target token to determine the value of the user instance group master key associated with that particular user instance group. These data will be referred to as the user instance group master key transfer data. In some embodiments loading of the user instance group master key into the token may be secured using a cryptographic key related to the batch master key of the token. In some embodiments a token may determine the value of the user instance group master key by cryptographically combining the user instance group master key transfer data with the batch master key that had already been loaded in the token. As such the user instance group master key transfer data may be a function of the user instance group master key and the batch master key of the target token. For example in some embodiments the user instance group master key transfer data in the first user instance group loading message may comprise the user instance group master key encrypted with the batch master key of the target token.

In some embodiments the first user instance group loading message may be generated by an instance loading server. In some embodiments an application server may also be an instance loading server, or an instance loading server may be comprised in an application server.

In some embodiments the same first loading message can be used with any token of any batch. For example in some embodiments the user instance group master key transfer data may comprise different batch related values, one value for each batch, whereby each different batch related value may be a function of the user instance group master key and the batch master key of the batch the value is related to, such that all tokens that receive the first loading message comprising the user instance group master key transfer data with all these batch related values may determine the same value for the user instance group master key by cryptographically combining their batch master key with the value corresponding to their batch. For example, in some embodiments each batch related value comprises the user instance group master key encrypted by the batch master key of the batch that the batch related value is related to, and the first loading message may comprise all the batch related values, and the tokens may be adapted to decrypt the batch related value corresponding to their batch with their batch master key so that all tokens that receive the first loading message end up with the same value for the user instance group master key. In this way the same first loading message can be used by a particular user to initiate the loading of an instance of the user instance group associated with that user on any token the user wishes. In some embodiments the same first loading message can be re-used with a plurality of different tokens. In this way the same first loading message can be re-used by a particular user to initiate the loading of instances of the user instance group associated with that user on more than one tokens.

In some embodiments the user instance group master keys may be generated by the token provider and supplied by the token provider to the application providers. In some embodiments the batch related values may also be generated by the token provider and supplied to the application providers. In other embodiments the values of the user instance group master keys may be chosen by the respective application providers and the batch related values may be generated by a trusted party that has access to the values of the batch master keys and provided to the appropriate application providers.

In some embodiments the first loading message is provided to the user associated with the user instance group by means of some communication channel that may be regarded as sufficiently secure, such that the user can provide it to a token of his or her choice. For example in some embodiments the tokens may comprise a data input interface adapted to capture and decode two-dimensional barcodes and the first loading message may be sent to the user in the form of an email containing the barcode or in the form of a letter with the barcode printed on it and e.g. sent via registered mail.

After the first loading message has been received by a token and the token has determined the value of the user instance group master key, the token may generate a first loading confirmation code which the token may for example present to the user to forward to the application server to indicate to the application server that the first loading message was successfully received and processed. In some embodiments the first loading confirmation code may comprise data that will allow the application server to determine the token identity. For example the first loading confirmation code may comprise the Device ID of the token. In some embodiments the first loading confirmation code may comprise cryptographically generated data that demonstrates to the application server that the token has indeed successfully determined the correct value of the user instance group master key. For example the first loading confirmation code may comprise a response that the token generates by cryptographically combining a value present in the first loading message with the value that the token determined for the user instance group master key.

Second Stage of Instance Loading Process

In a second stage of the instance loading process a second loading message (or second stage loading message) may be generated. The second loading message may be used to transfer to the token some data that the token may use to determine some secret values of the instance such as the set of payload keys and the set of credential generation keys associated with the instance. In some embodiments the token may determine these data to be transferred or these secret values themselves as a function of data received in the second loading message and the instance's user instance group master key. The second loading message may be cryptographically secured using the instance's user instance group master key, for example to protect the confidentiality and/or the integrity and/or the authenticity of the data in the message such as the data that the token may use to determine security sensitive instance data such as the payload keys or the credential generation keys. In some embodiments the user instance group master key may be used directly to secure the second loading message (e.g. by encryption of the contents of the second loading message with the user instance group master key). In some embodiments the user instance group master key may be used directly to secure the second loading message; for example in some embodiments a cryptographic key may be derived from the user instance group master key and that derived key may be used to secure the second loading message (e.g. to encrypt the contents of the second loading message). For example in some embodiments the second loading message may comprise a payload key and a credential generation key of an instance encrypted with the user instance group master key of that instance or encrypted with a key derived from the user instance group master key of that instance. In some embodiments the second loading message may be targeted to a specific individual token. In some embodiments the second loading message may be cryptographically linked to a specific individual token so that a particular token receiving the second loading message may determine whether it is indeed the specific token that is targeted by the second loading message. For example in some embodiments the second loading message may comprise a MAC over the Device ID whereby that MAC is generated with the user instance group master key, or the data comprised in the second loading message encrypted with the user instance group master key may also comprise the Device ID. In some embodiments the second loading message may be cryptographically protected (e.g. encrypted or provided with a MAC or signature over the message contents) using a cryptographic key that may be derived from the token's Device ID and the user instance group master key.

In some embodiments all instances of the same user instance group share the same values for one or more of the payload secrets for securing messages exchanged between a server and a token comprising one of these instances. In some embodiments all instances of the same user instance group share the same payload secrets for securing messages sent from a server to a token comprising one of these instances. In some embodiments the values of one or more of the credential generation secrets may be shared by all instances of the same user instance group. In some embodiments the values of at least one or some or all of an instance's credential generation secrets may be unique for that instance. In some embodiments the values of at least one or some or all of an instance's payload secrets may be unique for that instance. For example in some embodiments the payload keys for securing messages generated by a token for a particular instance and destined for a server may be unique for that instance.

In some embodiments the values of the payload keys and/or the values of the credential generation keys are chosen by the application provider associated with the user instance group that the instance (that is associated with the payload keys and the credential generation keys) belongs to. In other embodiments the values of the payload keys and/or the values of the credential generation keys may be chosen by the token provider and supplied to the appropriate application provider.

In some embodiments the second loading message is provided to the user associated with the instance by means of some communication channel that may be regarded as sufficiently secure, such that the user can provide it to the target token. For example in some embodiments the second loading message may be provided to the user in a web session during which the user returned the first loading confirmation code. In some embodiments the user may be required to authenticate prior to receiving the second loading message. For example, if the user had already received another instance before, the user may be required to provide a one-time password generated with such other instance.

After the second loading message has been received by the target token and the token has determined the values of the instance data, the token may generate a second loading confirmation code which the token may for example present to the user to forward to the application server to indicate to the application server that the second loading message was successfully received and processed and that the instance has been successfully loaded. For example the second loading confirmation code may comprise a one-time password generated by the token with the credential generation keys of the loaded instance.

In some embodiments an authentication token may be adapted to accept the loading of no more than two instances of the same user instance group. In some embodiments a first loading message may comprise a data element identifying the user instance group associated with this first loading message. In some embodiments a second loading message may comprise a data element identifying the user instance group of the instance associated with this second loading message. In some embodiments a second loading message may comprise a data element identifying the instance associated with this second loading message. In some embodiments the second loading message may comprise a data element allowing the authentication token receiving the second loading message to link the received second loading message to an earlier received first loading message. In some embodiments an authentication token may be adapted to reject a second loading message that cannot be linked to an earlier corresponding first loading message.

Operational Phase

After the instance has been successfully loaded into the target token, the instance enters operational phase. The token with the instance may now receive messages or commands targeting the instance and act upon them. In some embodiments the messages or commands targeting instances may be secured with the payload keys associated with the targeted instances. For example the token may generate a dynamic credential, comprising for example a transaction data signature, using the credential generation keys of the loaded instance in response to receiving a transaction data signature command comprising data to be signed and secured with the payload keys corresponding to the loaded instance.

For example in some embodiments the application may generate and communicate to the token a credential generation command. In some embodiments the credential generation command may be authenticated using one or more payload keys which may be associated with a particular instance or with a particular user instance group. For example the credential generation command may be signed or MAC'ed with one payload key and the contents of the credential generation command may be encrypted with another payload key. Upon receiving the credential generation command the token may retrieve or determine the applicable payload keys. If applicable the token may authenticate the received credential generation command e.g. by verifying a signature or MAC with the applicable payload key. If the authentication of the received credential generation command failed, the token may reject the received credential generation command. Upon rejecting the received credential generation command the token may output an error message to the user. If the applicable the token may decrypt the contents of the received credential generation command. The token may determine and select the instance for which the received credential generation is destined as explained in more detail elsewhere in this description. If the token is not able to determine and select one of the instances comprised in the token as the instance that is targeted by the received credential generation message then the token may reject the received credential generation command. Upon rejecting the received credential generation command the token may output an error message to the user. If the received credential generation command contains transaction data to be signed then the token may present the transaction data to the user and request the user to approve or reject the transaction. If the user rejects the presented transaction data the token may reject the received credential generation command. If the received credential generation message is accepted the token may generate a dynamic credential conform the contents of the received credential generation message and using the appropriate credential generation key of the selected instance. For example if the received credential generation message indicates that a one-time password should be generated then the token may generate a one-time password. If the received credential generation message comprises a challenge then the token may generate a response. If the received credential generation message comprises transaction data then the token may generate a signature over these transaction data. In some embodiments the token may then present the generated credential to the user for the user to forward to the application. In some embodiments the token may generate a credential generation response message comprising the generated credential and send this a credential generation response message. The application may, upon receiving the generated credential, verify the received generated credential.

In some alternative embodiments the loading of the instance in a particular token may be done with a single loading message. In some embodiments that single loading message is targeted towards a particular token and can only be used with that particular token. In some embodiments that single loading message is cryptographically linked to that particular token as explained above in more detail. In other embodiments that single loading message can be used with all tokens.

In some embodiments there are more than one token providers. In some embodiments the batch master keys are not generated by and known to the token providers. In some embodiments the batch master keys are generated and known only to trusted third party which takes care of all operations not performed by a token and requiring the knowledge of a batch master key. In some embodiments token providers initialize the tokens they provide with a token provider master key. In some embodiments the appropriate batch master keys are loaded into the tokens by means of messages that are secured using the token provider master keys present in these tokens. In some embodiments this loading of the batch master keys happens before the distribution of the tokens among the users. In some embodiments the token providers supply their token provider master key to the trusted party.

BRIEF DESCRIPTION OF THE DRAWINGS

The foregoing and other features and advantages of the invention will be apparent from the following, more particular description of embodiments of the invention, as illustrated in the accompanying drawings.

DETAILED DESCRIPTION

Some implementations of the present invention are discussed below. While specific implementations are discussed, it should be understood that this is done for illustration purposes only. A person skilled in the relevant art will recognize that other components and configurations may be used without parting from the spirit and scope of the invention. Various specific details are provided in order to enable a thorough understanding of the invention. However, it will be understood by a person skilled in the relevant art that the present invention may be practiced without these specific details. In other instances, well-known methods, procedures, components and circuits have not been described in detail so as not to obscure the present invention. Various modifications to the described embodiments will be apparent to persons skilled in the art, and the general principles of the embodiments described in detail below may be applied to other embodiments.

Figure 1:
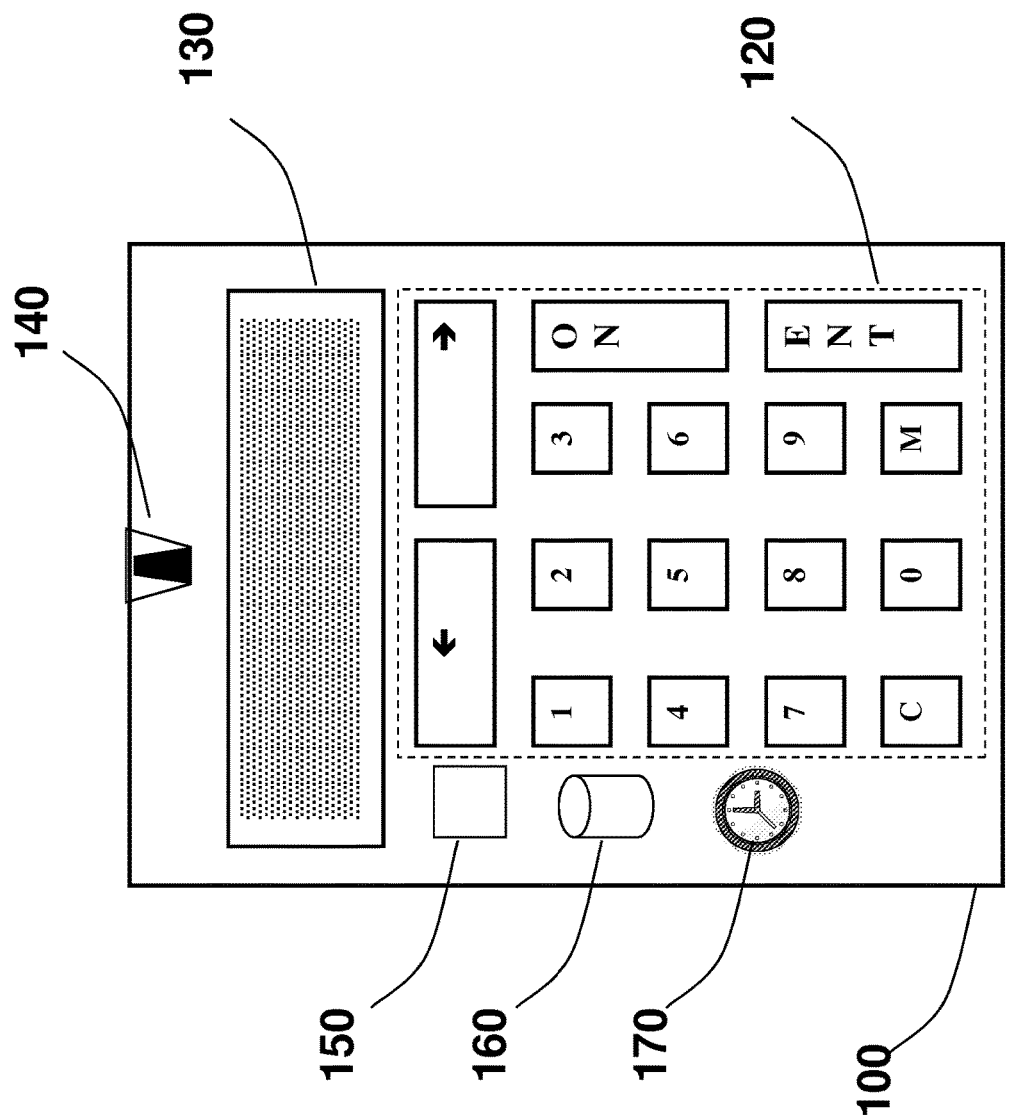
FIG. 1 schematically illustrates an exemplary apparatus according to an aspect of the invention.

FIG. 1 schematically illustrates an exemplary apparatus (100) of the invention according to an aspect of the invention. The apparatus of FIG. 1 comprises a strong authentication token. In some embodiments the strong authentication token is adapted to generate dynamic credentials on behalf of a user. In some embodiments the dynamic credentials generated by the strong authentication token may comprise for example one-time passwords and/or electronic signatures over for example transaction data and/or responses to challenges.

Multiple Instances

In some embodiments the strong authentication token is adapted to support multiple (i.e. more than one) instances which may each be associated with a different user. In some embodiments each instance may comprise data that the token may use to determine for example cryptographic keys such as one or more cryptographic credential generation keys that the token may use to generate a dynamic credential on behalf of the user associated with that instance. See the explanation above for more details on the data that may be comprised in an instance, how tokens may use instances, on the management and life-cycle of instances, and on the various relations between instances, tokens and users.

Processor (150) and Memory (160).

The token may comprise a digital data processing component (150) that may be adapted to execute a set of data processing instructions, e.g., to implement one or more of the functions attributed to tokens described herein. In some embodiments the data processing component (150) may comprise for example one or more microprocessors, microcontrollers, Digital Signal Processor (DSP) chips, Field Programmable Gate Arrays (FPGA), etcetera.

The token may comprise a memory component (160). The memory component (160) may be connected to the digital data processing component (150). In some embodiments the memory component may comprise a program memory component that is adapted to store software or firmware to be executed by the data processing component. In some embodiment the functionality that the token supports may be defined by the software or firmware stored in its memory.

In some embodiments the memory component (160) may comprise a data memory component that is adapted to permanently or temporarily store data. In some embodiments the data memory component may be adapted to securely store secret data such as cryptographic keys or PIN or password reference data. In some embodiments the data memory component may be adapted to store the data of multiple instances.

The memory component may for example comprise RAM (Random Access Memory) memory, ROM (Read-Only Memory) memory, EPROM (Erasable Programmable Read-Only Memory) memory, one-time programmable memory, flash memory, solid-state memory, a hard-disk, etc.

User Interface (120, 130)

In some embodiments the strong authentication token may comprise a user interface (120, 130) to interact with a user e.g. to exchange data, information and/or commands with a user. The user interface (120, 130) may be connected to the digital data processing component (150).

In some embodiments the strong authentication token's user interface may comprise an output user interface (130) for presenting information and/or data to a user of the strong authentication token. In some embodiments the output user interface may comprise for example a display (130) or an audio output interface. In some embodiments the strong authentication token's user interface may comprise an input user interface (120) for receiving inputs from a user such as for example input data (like a challenge or transaction data) or instructions (like a confirmation or cancellation) or a PIN. In some embodiments the input user interface may comprise for example a keyboard (120). In some embodiments the strong authentication token's user interface may comprise a touch screen which may be adapted to offer both the functions of a user output interface and a user input interface.

Data Input Interface (140)

In some embodiments the strong authentication token may comprise a digital data input interface. The data input interface (140) may be connected to the digital data processing component (150). In some embodiments the strong authentication token's digital data input interface may be adapted to receive digital data messages. In some embodiments the data input interface may comprise an optical image acquiring component (140). In some embodiments the optical image acquiring component may comprise a camera. In some embodiments the strong authentication token may be adapted to capture with the optical image acquiring component images that may be encoded with a digital data message. In some embodiments the image may comprise a two-dimensional barcode. In some embodiments the format of the image may be defined in a standard. For example in some embodiments the optical image may be a QR-code.

In other embodiments the digital data input interface may comprise an acoustical interface adapted to capture acoustical signals that may be encoded with a messages or commands for the token. In some embodiments the acoustical interface may comprise a microphone. In some embodiments the acoustical interface may comprise an analogue-to-digital convertor to convert the analogue electronic signal into a digital signal that may be further processed by for example the digital data processing component discussed above.

In some embodiments the strong authentication token may comprise a data output interface (141). The data output interface (141) may be connected to the digital data processing component (150). In some embodiments the strong authentication token's digital data output interface may be adapted to send digital data messages. For example in some embodiment the authentication token may comprise a bidirectional data interface that may be adapted to receive and send messages, i.e. a data interface that combines a data input interface and a data output interface. For example in some embodiments the token may comprise a data interface which comprises a wireless data communication interface, such as a mobile data communication interface or a Bluetooth® interface, including an antenna and appropriate chip set. In some embodiments the token may comprise a data interface which may for example comprise a Universal Serial Bus (USB) interface including a USB connector and chipset.

In other embodiments the strong authentication token may not comprise a data output interface for outputting in digital format a digital data message comprising a generated dynamic credential and the only way to output a generated dynamic credential is by presenting it to the user using the output user interface.

Token Command Messages

In some embodiments the strong authentication token may be adapted to process and act upon data messages that it may receive. In some embodiments the strong authentication token may be adapted to receive, process and act upon a message for loading an instance in the token. In some embodiments the strong authentication token may be adapted to receive, process and act upon a message containing transaction data to be signed. In some embodiments the strong authentication token may be adapted to receive, process and act upon a message prompting the strong authentication token to generate a one-time password. In some embodiments the strong authentication token may be adapted to receive, process and act upon a message containing a challenge value and prompting the strong authentication token to cryptographically calculate a response value using the received challenge value and a secret stored in the strong authentication token.

In some embodiments a data message received by the strong authentication token may be destined for a particular instance supported by the strong authentication token. In some embodiments the strong authentication token is adapted to detect for which instance a received data message is destined. In some embodiments a received data message may comprise a destination instance indicating data element that may give an indication of the instance for which the message is destined.

More details on the digital data messages that a token may receive, process and act upon and on how a token may determine for which instance a received data message is destined may be found elsewhere in this description.

Credential Generation

The token may be adapted to generate dynamic credentials as explained in more detail elsewhere in this description. In some embodiments the data processing component (150) may be adapted to perform cryptographic calculations to generate the dynamic credentials. In some embodiments the token may be adapted to generate dynamic credentials using cryptographic keys that may be stored permanently or temporarily in the memory component (160) or that the token may derive from data stored permanently or temporarily in the memory component (160). In some embodiments the token may be adapted to generate dynamic credentials using data that is part of an instance stored in the memory component (160). In some embodiments the token may be adapted to use a symmetric cryptographic algorithm to generate the dynamic credentials. In some embodiments this cryptographic algorithm for generating dynamic credentials may be parameterized with one or more symmetric secret cryptographic credential generation keys. In some embodiments these credential generation keys may be associated with an instance comprised in the token. In some embodiments the credential generation keys of an instance may be shared with a server such as for example a credential verification server.

In some embodiments the token may be adapted to generate dynamic credentials using a dynamic variable that may comprise an internal value provided by the token. For example in some embodiments the token may comprise a clock (170) and the token may use as an internal value the time value provided by that clock. In some embodiments the token may maintain a counter as part of the data of an instance and the token may be adapted to use the value of that counter as in internal value to generate a dynamic credential for that instance and update the value of that counter (e.g. by incrementing or decrementing) each time the token uses the value of that counter to generate a dynamic credential.

In some embodiments the token may be adapted to generate dynamic credentials using a dynamic variable that may comprise an external value provided to the token. In some embodiments such an external value may comprise a challenge generated by a server or transaction data to be signed. In some embodiments the external value may be manually provided to the token by the user by using the user input interface of the token. For example the token may capture a challenge or transaction data the user may enter as a string of characters on a keyboard comprised in the token. In some embodiments the external value is provided comprised in a message or command that is received by the token by means of its data input interface.

In some embodiments the token may be adapted to present the generated dynamic credential to the user. For example in some embodiments the token may display the generated dynamic credential as a string of readable characters on its display. In some embodiments the string may comprise only decimal characters. In other embodiments the string may comprise alphanumerical characters.

Secure Dedicated Hardware Token

In some embodiments the token (100) is a dedicated hardware device. In some embodiments the token may be dedicated to be used in methods to secure a user's access to an application or to secure a user's interaction with such an application. In some embodiments the main goal of the authentication device is to be used in methods to secure a user's access to an application or to secure a user's interaction with such an application. In some embodiments, in order to guarantee the authentication device's dedication to its use as a security device, the authentication device may be adapted to make it impossible to alter its firmware. In some embodiments, in order to guarantee the authentication device's dedication to its use as a security device, any change to or update of its firmware is only possible through a secure firmware update protocol that is designed to ensure that only an authorised controlling trusted party can update or change the firmware of the authentication device. This enables the controlling trusted party to ensure that no firmware update happens which would undo the authentication device's dedication to its use in methods to secure a user's access to an application or to secure a user's interaction with such an application. Devices where the users can install extra software that is not authorized by a controlling trusted party cannot be considered dedicated devices. Devices the main purpose of which is to offer telecommunication facilities cannot be considered devices dedicated to be used in methods to secure a user's access to and interaction with an application. General purpose PCs, laptops, tablet computers and smartphones cannot be considered dedicated devices.

In some embodiments the token (100) is a secure hardware device. In some embodiments the secure hardware device is adapted to ensure detection of and/or resist to attempts to tamper with the secure hardware device. In some embodiments the housing of the secure hardware device is adapted to resist to opening the housing and/or to increase the probability that a user will notice attempts to open the housing through deformation of the housing (tamper evidence). In some embodiments parts that together make up the housing may be welded or glued together so that attempts to detach these parts will typically lead to obvious deformation of the housing. In some embodiments the secure hardware device comprises a switch that detects opening of the housing. In some embodiments the secure hardware device is adapted to take appropriate action upon detecting an attempt to tamper. In some embodiments the secure hardware device may erase certain sensitive data such as cryptographic keys or some or all instance data, or the secure hardware device may (possibly irreversibly) go into an error mode or cease to function upon detecting an attempt to tamper with the secure hardware device.

The secure hardware device may have a secure user output interface (e.g. a secure display) and a secure user input interface (e.g. a secure keyboard). In some embodiments the secure hardware device has an output interface that is secure in that it is fully controlled by the secure hardware device and that it cannot be used to present data or information to a user by a process external to the secure hardware device or that it can only be used to present data or information to a user by a process external to the secure hardware device if that is authorized and controlled by the secure hardware device. In some embodiments the secure hardware device has a user input interface that is secure in that it is fully controlled by the secure hardware device and that it cannot be used to obtain data or information from a user by a process external to the secure hardware device or that it can only be used to obtain data or information from a user by a process external to the secure hardware device if that is authorized and controlled by the secure hardware device. In some embodiments the security of the secure user input and output interfaces is maintained by the secure hardware device not allowing any change to its firmware or providing a secure firmware update mechanism that only allows changes to its firmware through a secure protocol that ensures that the secure hardware device accepts only authorised firmware updates from a trusted source.

In some embodiments the token is not a dedicate hardware device. In some embodiments the token may comprise an electronic consumer device the primary purpose of which may not be to provide authentication functionality but which may comprise software for providing the strong authentication token functionality described in this description. For example in some embodiments the token may comprise a tablet computer or a smartphone comprising an authentication app providing the strong authentication token functionality described in this description.

Form Factor

In some embodiments the token may comprise a plastic circuit board on which at least some of the electronic components comprised in the token may be arranged. Other electronic components may be galvanically connected to components arranged on the circuit board (e.g. by electrical wires). In some embodiments all electronic components of the token are comprised within a single housing. In some embodiments the housing may be made of plastic or of metal or of a combination of materials. In some embodiments the authentication token may be a monolithic device. In the context of this description this means that the digital data processing component for generating the dynamic credentials, the memory component for storing instance data, the input user interface, the output user interface and the data input interface comprised in the authentication token are all comprised into a single physical device. In some embodiments these components cannot be removed by the user as part of the ordinary operation of the authentication token. In some embodiments these components cannot be removed without causing irreversible change to the authentication token. In some embodiments these components cannot be removed without permanent damage to the authentication token.

Size and Weight

In some embodiments the token has a weight and spatial measures such that the token can be considered to be a portable, pocket-sized, hand-held device. In some embodiments the reader has a weight and spatial measures such that the token can be sent to the user through mail at moderate costs. For example in some embodiments the authentication device may have a thickness of less than 2 cm, a width of less than 10 cm, a length of less than 15 cm, and a weight of less than 200 grams. In other embodiments the authentication device may have a thickness of less than 1.5 cm, a width of less than 7 cm, a length of less than 13 cm, and a weight of less than 110 grams. In some embodiments the length and width of the authentication device may exceed the length respectively the width of a standard full size credit card by no more than 10 percent. In some embodiments the authentication device may have the length and width of a standard full size credit card. In some embodiments the authentication device may have the length, width and thickness of a standard full size credit card within the margins applicable for standard full size credit cards (e.g. having the dimensions of an ID-1 sized smart card as specified by ISO/IEC 7810).

Power Source

In some embodiments the authentication device comprises an autonomous source of electrical power. In some embodiments the power source may comprise a battery. In some embodiments the battery may be replaceable.

Service Menu

In some embodiments the token may support a service menu offering several options to the user to access various token functionality. For example the service menu may comprise a Help option by means of which the user can access help information. The service menu may comprise a language menu for the user to set language preferences. The service menu may comprise an option to select a particular instance. The service menu may comprise an option to initiate an unlock instance operation. The service menu may comprise an option to initiate an instance removal operation. The service menu may comprise an option to initiate an instance loading operation. The service menu may comprise an option to initiate a dynamic credential generation. The service menu may comprise an option to access token information (such as for example a token identifying data element). The service menu may comprise an option to get an overview of loaded instances. The service menu may comprise an option to access information about particular instances (such as for example instance identifying data elements).

In one aspect of the invention an authentication token for authenticating more than one users or for securing interaction between said more than one users and one or more applications is provided.

In a first set of the embodiments the authentication token may comprise a plurality of token instances, each token instance comprising instance data and each token instance associated with one of a plurality of at least two different users of the token whereby at least one different token instance is associated with each of said plurality of at least two different users, and the authentication token may be adapted to generate a dynamic credential using a secret credential generation key comprised in or derived from the instance data of a selected token instance of said plurality of token instances for authenticating a user associated with said selected token instance or for securing interaction between user associated with said selected token instance and one or more applications. In some embodiments said authentication token may comprise any of the authentication tokens described elsewhere in this description.

Receiving Messages

In a second set of embodiments the token may be any token of the previous set of embodiments whereby the token may be further adapted to receive a server message and to decode and process said server message.

In a third set of embodiments the token may be any token of the second set of embodiments whereby said received server message is targeted towards a particular targeted token instance of said plurality of token instances and whereby the token may be further adapted to autonomously (i.e. without using inputs of a user of the token) determine and select said targeted token instance on the basis of said received server message.

In a fourth set of embodiments the token may be any token of the third set of embodiments whereby the token may be further adapted to determine and select the targeted token instance using a token instance identifying data element in the received server message.

In a fifth set of embodiments the token may be any token of the third set of embodiments whereby the token may be further adapted to determine and select the targeted token instance by verifying a cryptographically protected element or aspect of said received server message using a cryptographic algorithm parameterized with a cryptographic payload key associated with a candidate token instance of said plurality of token instances, whereby the token may be adapted to select said candidate token instance as the targeted token instance if said verification is successful.

In a sixth set of embodiments the token may be any token of the fifth set of embodiments whereby the token may be further adapted to cycle through the plurality of token instances and considering or trying out one by one each of said plurality of token instances as a candidate at least until said verifying of a cryptographically protected element or aspect of said received server message with any candidate token instance yields a candidate token instance for which said verifying is successful or until said verifying of a cryptographically protected element or aspect of said received server message with all token instances of the plurality of token instances has not been successful for any of the token instances of the plurality of token instances.

In a seventh set of embodiments the token may be any token of the sixth set of embodiments whereby the token may be further adapted to select the first token instance for which said verifying of a cryptographically protected element or aspect of said received server message is successful.

In an eighth set of embodiments the token may be any token of the fifth or sixth set of embodiments whereby the token may be further adapted to reject said server message if the token doesn't find a candidate token instance for which said verifying of a cryptographically protected element or aspect of said received server message is successful.

In a ninth set of embodiments the token may be any token of the fifth to eighth sets of embodiments wherein each token instance of said plurality of token instances has a unique value for said payload key with respect to the payload key values of the other token instances of said plurality of token instances.

Generating Credentials

In a tenth set of embodiments the token may be any token of any of the second to ninth set of embodiments whereby said received server message may comprise a credential generation command message and the token may be further adapted to generate said dynamic credential in response to said credential generation command message.

In an eleventh set of embodiments the token may be any token of any of the third to ninth set of embodiments whereby said received server message may comprise a credential generation command message and the token may be further adapted to generate said dynamic credential in response to said credential generation command message and said selected token instance is said targeted token instance targeted by said received server message.

In a twelfth set of embodiments the token may be any token of any of the previous sets of embodiments, whereby the token may be further adapted to use a symmetric cryptographic algorithm in said generating of a dynamic credential, said symmetric c cryptographic algorithm parameterized with said secret credential generation key, said secret credential generation key comprising a symmetric secret key.

Instance Management

Instance Loading

In a 13-th set of embodiments the token may be any token of any of the previous sets of embodiments, whereby the token may be further adapted to receive an additional token instance, whereby the authentication token may be comprised in at least one of a plurality of token batches, whereby with each token batch of said plurality of token batches a value of a batch master key may be associated and whereby the authentication token may comprise the value of the batch master key of said at least one of said plurality of token batches that comprises the authentication token. The authentication token may be further adapted to receive and process, as part of a first loading process stage for transferring to the authentication token a value of a user instance group master key, a first stage loading message that may comprise a set of batch related values, one batch related value for each of said token batches, wherein the value of each batch related value may have been determined such that it is possible to calculate the same value of said user instance group master key, as a function of any pair of a batch master key of any particular one of said token batches and the batch related value corresponding to that particular token batch. The authentication token processing said first stage loading message may comprise: the authentication token retrieving from the first stage loading message that it has received, a batch related value that corresponds to the same token batch that said batch master key, the value of which is comprised in the authentication token, also corresponds to; the authentication token calculating the value of the user instance group master key as a function of said batch master key comprised in the authentication token and said batch related value that the authentication token may have retrieved from the first stage loading message; and the authentication token storing the calculated value of the user instance group master key. The authentication token may be further adapted to receive and process, as part of a second loading process stage for transferring to the authentication token a set of instance data values for the additional token instance, a second stage loading message that may include said set of instance data values for the additional token instance and that may be secured with said user instance group master key or a key derived from the user instance group master key. The authentication token processing said second stage loading message may comprise: the authentication token retrieving said set of instance data values from the second stage loading message it may have received by using the value of the user instance group master key that the authentication token may have calculated in the first loading process stage; and the authentication token determining the values of a set of secret keys of said additional token instance by using said retrieved set of instance data values, whereby said set of secret keys of the additional token instance may comprise said secret credential generation key that the authentication token may subsequently use for generating dynamic credentials for said additional token instance.

Instance Removal

In a 14-th set of embodiments the token may be any token of any of the previous sets of embodiments whereby the token may be further adapted to support a an instance removal process to remove at least one obsolete token instance of said plurality of token instances. In some embodiments said instance removal process comprises the token erasing from a memory comprised in the token all instance data of said at least one obsolete token instances to be removed.

In a 15-th set of embodiments the token may be any token of the 14-th set of embodiments whereby the token may be further adapted to present the user a menu option for the user to initiate said instance removal process.

In a 16-th set of embodiments the token may be any token of the 14-th to 15-th set of embodiments whereby the token may be further adapted to present the user a menu for the user to select said obsolete token instance that the user wants the token to remove.

In a 17-th set of embodiments the token may be any token of the 14-th to 16-th sets of embodiments whereby the token may be further adapted to receive and process an instance removal command message, wherein said processing of said received instance removal command message may comprise removing said at least one obsolete token instances to be removed in response to said received instance removal command message.

In an 18-th set of embodiments the token may be any token of the 17-th set of embodiments whereby the token may be further adapted to select said at least one obsolete token instances for which the instance removal process is to be performed autonomously on the basis of the received instance removal command message. In some embodiments this autonomously selecting of said at least one obsolete token instances for which the instance removal process is to be performed may comprise using any of the mechanisms for determining and selecting a token instance that are described in more detail elsewhere in this description.

PIN or Password Handling

In a 19-th set of embodiments the token may be any token of any of the previous sets of embodiments, whereby the token may be further adapted to reserve the use of at least one protected token instance of said plurality of token instances to a user associated with that at least one protected token instance. In some embodiments the token may be adapted to verify whether a user attempting to use said at least one protected token instance corresponds to the user associated with that at least one protected token instance.

In a 20-th set of embodiments the token may be any token of the 19-th set of embodiments whereby the instance data of said at least one protected token instance comprises user credential reference data, and the token may be further adapted to receive from the user a user credential, to compare the user credential received from the user with said user credential reference data, and to allow the user to use said at least one protected token instance if the received user credential matches said user credential reference data and to refuse the user to use said at least one protected token instance if the received user credential doesn't match said user credential reference data.

In a 21-st set of embodiments the token may be any token of the 20-th set of embodiments whereby the user credential reference data may comprise a password reference value and said user credential may comprise a password value (which the token may receive e.g. through a user input interface of the token). In some embodiments the password value may consist of a sequence of only numerical digits. In some embodiments the password value may comprise a PIN (Personal Identification Number).

Change PIN or Password

In a 22-nd set of embodiments the token may be any token of the 21-st set of embodiments whereby the token may be further adapted to support a password change process to permit the user to change the user credential reference data of the at least one protected token instance.

In a 23-rd set of embodiments the token may be any token of the 22-nd set of embodiments whereby the token may be further adapted to present the user a menu option for the user to initiate said password change process.

In a 24-th set of embodiments the token may be any token of the 23-rd set of embodiments whereby the token may be further adapted to present the user a menu for the user to select the at least one protected token instance for which the user wants the token to perform the password change process.

In a 25-th set of embodiments the token may be any token of the 22-nd set of embodiments whereby the token may be further adapted to receive and process a password change command message, wherein said processing of said received password change command message may comprise initiating and performing the password change process in response to said received password change command message.

In a 26-th set of embodiments the token may be any token of the 25-th set of embodiments whereby the token may be further adapted to autonomously select the at least one protected token instance for which the password change process is to be performed on the basis of the received password change command message. In some embodiments this autonomously selecting of the at least one protected token instance for which the password change process is to be performed may comprise using any of the mechanisms for determining and selecting a token instance that are described in more detail elsewhere in this description.

Lock and Unlock PIN or Password

In a 27-th set of embodiments the token may be any token of the 21-st to 26-th set of embodiments whereby the token may be further adapted to lock (i.e. permanently refuse further use of) the at least one protected token instance if the user has provided for the at least one protected token instance a number of password values that don't match the password reference value of the at least one protected token instance whereby said number exceeds a predefined password try counter threshold value.

In a 28-th set of embodiments the token may be any token of the 27-th set of embodiments whereby the token may be further adapted to support a password unlock process to permit the user to undo said locking of said locked at least one protected token instance.

In a 29-th set of embodiments the token may be any token of the 28-th set of embodiments whereby the token may be further adapted to present the user a menu option for the user to initiate said password unlock process.

In a 30-th set of embodiments the token may be any token of the 29-th set of embodiments whereby the token may be further adapted to present the user a menu for the user to select the locked at least one protected token instance for which the user wants the token to perform the password unlock process.

In a 31-st set of embodiments the token may be any token of the 30-th set of embodiments whereby the token may be further adapted to receive and process a password unlock command message, wherein said processing of said received password unlock command message may comprise initiating and performing the password unlock process in response to said received password unlock command message.

In a 32-nd set of embodiments the token may be any token of the 31-st set of embodiments whereby the token may be further adapted to autonomously select the locked at least one protected token instance for which the password unlock process is to be performed on the basis of the received password unlock command message. In some embodiments this autonomously selecting of the locked at least one protected token instance for which the password unlock process is to be performed may comprise using any of the mechanisms for determining and selecting a token instance that are described in more detail elsewhere in this description.

Components

In a another set of embodiments the token may be any token of any of the previous sets of embodiments, whereby the token may further comprise a digital data processing component, a memory component which may be connected to the data processing component, a user input interface which may be connected to the data processing component, a user output interface which may be connected to the data processing component, and a data input interface which may be connected to the data processing component.

In a another set of embodiments the token may be any token of any of the previous sets of embodiments, whereby the memory component is adapted to store said instance data of said plurality of token instances.

In a another set of embodiments the token may be any token of any of the previous sets of embodiments, whereby the digital data processing component is adapted to generate said dynamic credential. In some embodiments the digital data processing component is adapted to perform cryptographic operations or cryptographic algorithms. In some embodiments the digital data processing component is adapted to retrieve or derive said secret credential generation key from said instance data. In some embodiments the digital data processing component is adapted to perform symmetric cryptographic algorithms. In some embodiments said retrieved or derived secret credential generation key may comprise a symmetric secret key.

In a another set of embodiments the token may be any token of any of the previous sets of embodiments, whereby the data input interface may be adapted to receive a server message and the digital data processing component may be adapted to process said server message. In some embodiments the data input interface may comprise a digital camera component and the server message may be comprised in one or more encoded two-dimensional images and said receiving of the server message may comprise the token using the digital camera component to capture said one or more encoded two-dimensional images and decoding said captured one or more encoded two-dimensional images to retrieve the server message.

In a another set of embodiments the token may be any token of any of the previous sets of embodiments, whereby the server message comprises a credential generation command message and said processing of said server message may comprise the digital data processing component processing said credential generation command message. In some embodiments said digital data processing component processing said credential generation command message may comprise the digital data processing component generating a dynamic credential. In some embodiments said digital data processing component generating a dynamic credential may comprise the digital data processing component retrieving data from the credential generation command message and using said retrieved data in a credential generation algorithm.

In a another set of embodiments the token may be any token of any of the previous sets of embodiments, whereby the digital data processing component may be adapted to generate output for the user and the user output interface may be adapted to present to the user said output for the user generated by the digital data processing component. In some embodiments said output may comprise an error message. In some embodiments said output may comprise transaction data comprised in a server message received by the data input interface. In some embodiments said output may comprise said generated dynamic credential.

In a another set of embodiments the token may be any token of any of the previous sets of embodiments, whereby the user input interface may be adapted to receive inputs from a user and the digital data processing component may be adapted to process said user input.

In a another set of embodiments the token may be any token of any of the previous sets of embodiments, whereby the digital data processing component may be adapted to generate output for the user and the user output interface may be adapted to present to the user said output for the user generated by the digital data processing component, wherein said output may comprise transaction data comprised in a server message received by the data input interface; whereby the user input interface may be adapted to receive inputs from a user and the digital data processing component may be adapted to process said user input, wherein said input received from said user may comprise an approval or a rejection of said transaction data presented to the user; and whereby said digital data processing component may be adapted to generate said dynamic credential conditional on whether the user has approved said presented transaction data.

In a second aspect of the invention a system for authenticating a plurality of at least two different users or for securing interaction between said plurality of at least two different users and a plurality of remotely accessible applications is provided.

Figure 2:
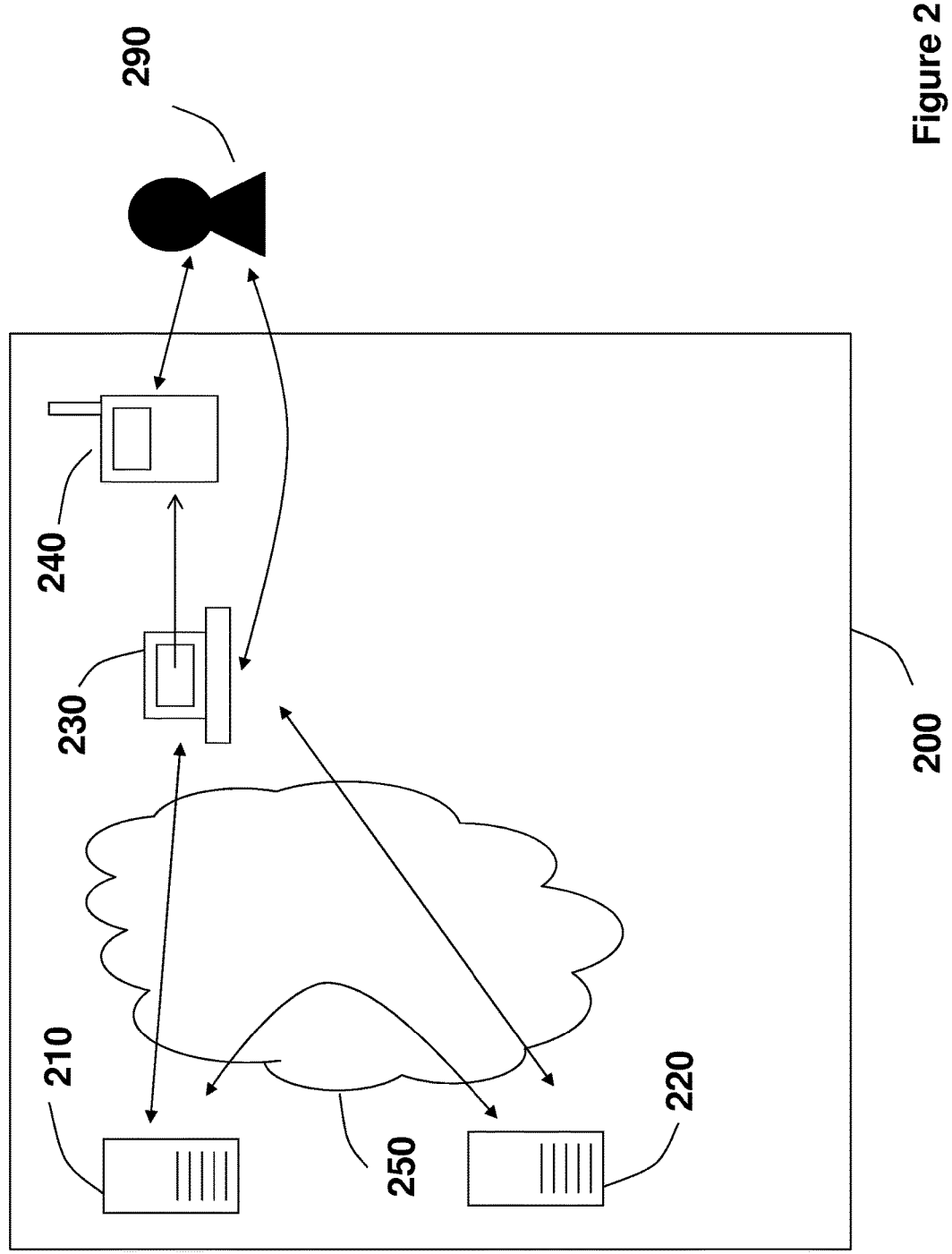
FIG. 2 schematically illustrates an exemplary system according to an aspect of the invention.

FIG. 2 schematically illustrates an exemplary system (200) of the invention according to this second aspect of the invention.

The system (200) may comprise one or more application servers (210), a plurality of access client devices (230), and a plurality of authentication tokens (240), whereby said application servers and said access client devices are connected by a computer network (250) allowing said application servers and said access client devices to communicate with each other, whereby each of said application servers host at least one of remotely accessible applications, each of said access client devices is adapted to interact with one or more of said plurality of users (290) to allow one or more users to interact with at least one of said remotely accessible applications; the system further comprising a plurality of token instances, each token instance comprising instance data and associated with a single one of said plurality of at least two different users and comprised in at least one of said plurality of authentication tokens, whereby with each user one or more token instances are associated, whereby each authentication token comprises one or more token instances and at least one of the plurality of authentication tokens comprises at least two different token instances associated to two different users; whereby at least one different token instance is associated with each of said plurality of at least two different users, and whereby each particular authentication token of said plurality of authentication tokens may be adapted to generate a dynamic credential using a secret credential generation key comprised in or derived from the instance data of a selected token instance comprised in said particular authentication token for authenticating a user associated with said selected token instance to one of said applications or for securing interaction between said user associated with said selected token instance and said one of said applications.

In some embodiments said authentication tokens may comprise any of the authentication tokens described elsewhere in this description. In some embodiments an application server may comprise one or more physical server computers. In some embodiments the application servers may be adapted to verify dynamic credentials that are generated by authentication tokens for authenticating users of said authentication tokens to one of the applications hosted by said application servers or for securing interaction between said users associated with said selected token instance and said one of the applications hosted by said application servers. In some embodiments an application server verifying dynamic credentials may comprise said application server delegating said cryptographic verification to one of a plurality of credential verification servers (220). In some embodiments such a credential verification server may be comprised in the same physical computer as an application server delegating the verification of dynamic credentials to that credential verification server. In some embodiments a credential verification server and an application server delegating the verification of dynamic credentials to that credential verification server may be comprised in different physical computers.

In a first set of embodiments of the system, the system may comprise any of the systems previously described and the system may further comprise one or more instance loading servers, the plurality of token instances may be grouped in a plurality of (mutually disjunctive) user instance groups whereby each different user instance group consists of all token instances that are associated with the same user and whereby with each user instance group a unique user instance group key is associated, and the plurality of authentication tokens may be grouped in a plurality of token batches whereby with each token batch a unique batch master key is associated whereby said batch master key is comprised in each authentication token comprised in the token batch that said batch master key is associated with; the instance loading servers and the authentication tokens may be adapted to support an instance loading process for loading an additional token instance into a target authentication token, the instance loading process comprising a first loading process stage for transferring to the target authentication token the value of a user instance group master key and a second loading process stage for transferring to the target authentication token a set of instance data values; whereby in the first loading process stage a first instance loading server generates a first stage loading message (which may also be referred to elsewhere in this application as a first loading message or first user instance group loading message) which is sent to said target authentication token and the target authentication token receives and processes said first stage loading message, and whereby in the second loading process stage a second instance loading server generates a second stage loading message (which may also be referred to elsewhere in this application as a second loading message) which is sent to said target authentication token and the target authentication token receives and processes said second stage loading message; whereby the first stage loading message comprises a set of batch related values, one batch related value for each of said token batches, each batch related value determined such that the same value for the user instance group master key can be calculated as a function of any pair of a batch master key of any particular one of said token batches and the batch related value corresponding to that particular token batch, and whereby the processing of the first stage loading message by the target authentication token comprises the target authentication token calculating the value of the user instance group master key as a function of a batch master key comprised in the target token and the batch related value comprised in the first stage loading message that corresponds to the token batch that said batch master key comprised in the target token also corresponds to; and whereby the second stage loading message comprises said set of instance data values whereby the second stage loading message is secured with the user instance group master key or a key derived from the user instance group master key, and whereby the target authentication token may retrieve said set of instance data values from the second stage loading message by using the value of the user instance group master key that the target authentication token has obtained in the first loading process stage and whereby the target authentication token may determine the values of a set of secret keys of said additional token instance by using said retrieved set of instance data values, whereby said set of secret keys of the additional token instance may comprise the additional token instance's secret credential generation key.

In a second set of embodiments the system may comprise any of the systems of the first set of embodiments whereby each particular batch related value in said first stage loading message are generated by encrypting the user instance group master key with the batch master key associated with the token batch that said particular batch related value corresponds to and whereby the target authentication token obtains the value of the user instance group master key by decrypting—with said batch master key comprised in the target token—the batch related value comprised in the first stage loading message that corresponds to the token batch that said batch master key comprised in the target token also corresponds to.

In a third set of embodiments the system may comprise any of the systems of the first to second sets of embodiments whereby said set of instance data values comprised in the second stage loading message may be encrypted using the user instance group master key and whereby the target authentication token may retrieve said set of instance data values from the second stage loading message by decrypting the encrypted set of instance data values from the second stage loading message using the value of the user instance group master key that the target authentication token has obtained in the first loading process stage. In some embodiments the set of instance data values comprised in the second stage loading message may be encrypted with the user instance group master key and the target authentication token may retrieve said set of instance data values from the second stage loading message by decrypting the encrypted set of instance data values from the second stage loading message with the value of the user instance group master key that the target authentication token has obtained in the first loading process stage. In some embodiments the set of instance data values comprised in the second stage loading message may be encrypted with a key derived from the user instance group master key and the target authentication token may retrieve said set of instance data values from the second stage loading message by decrypting the encrypted set of instance data values from the second stage loading message with a key derived from the value of the user instance group master key that the target authentication token has obtained in the first loading process stage.

In a fourth set of embodiments the system may comprise any of the systems of the first to third sets of embodiments whereby the additional token instance's secret credential generation key is comprised in said set of instance data values comprised in the second stage loading message.

In a fifth set of embodiments the system may comprise any of the systems of the first to fourth sets of embodiments whereby the target authentication token derives the additional token instance's secret credential generation key from said set of instance data values comprised in the second stage loading message.

In a sixth set of embodiments the system may comprise any of the systems of the first to fifth sets of embodiments whereby the target authentication token determines the values of one or more payload keys from said set of instance data values comprised in the second stage loading message, whereby said payload keys may subsequently be used to secure subsequent messages exchanged between an application server and the target authentication token and destined or related to said additional token instance.

In a seventh set of embodiments the system may comprise any of the systems of the first to sixth sets of embodiments whereby the first stage loading message or the second stage loading message also comprises a data element identifying the additional token instance or a data element identifying the user instance group of the additional token instance.

In an eighth set of embodiments the system may comprise any of the systems of the first to seventh sets of embodiments whereby the first stage loading message or the second stage loading message also comprises other data elements of the additional token instance.

In a third aspect of the invention a method for loading an additional token instance into a multi-instance authentication token is provided.

Figure 3:
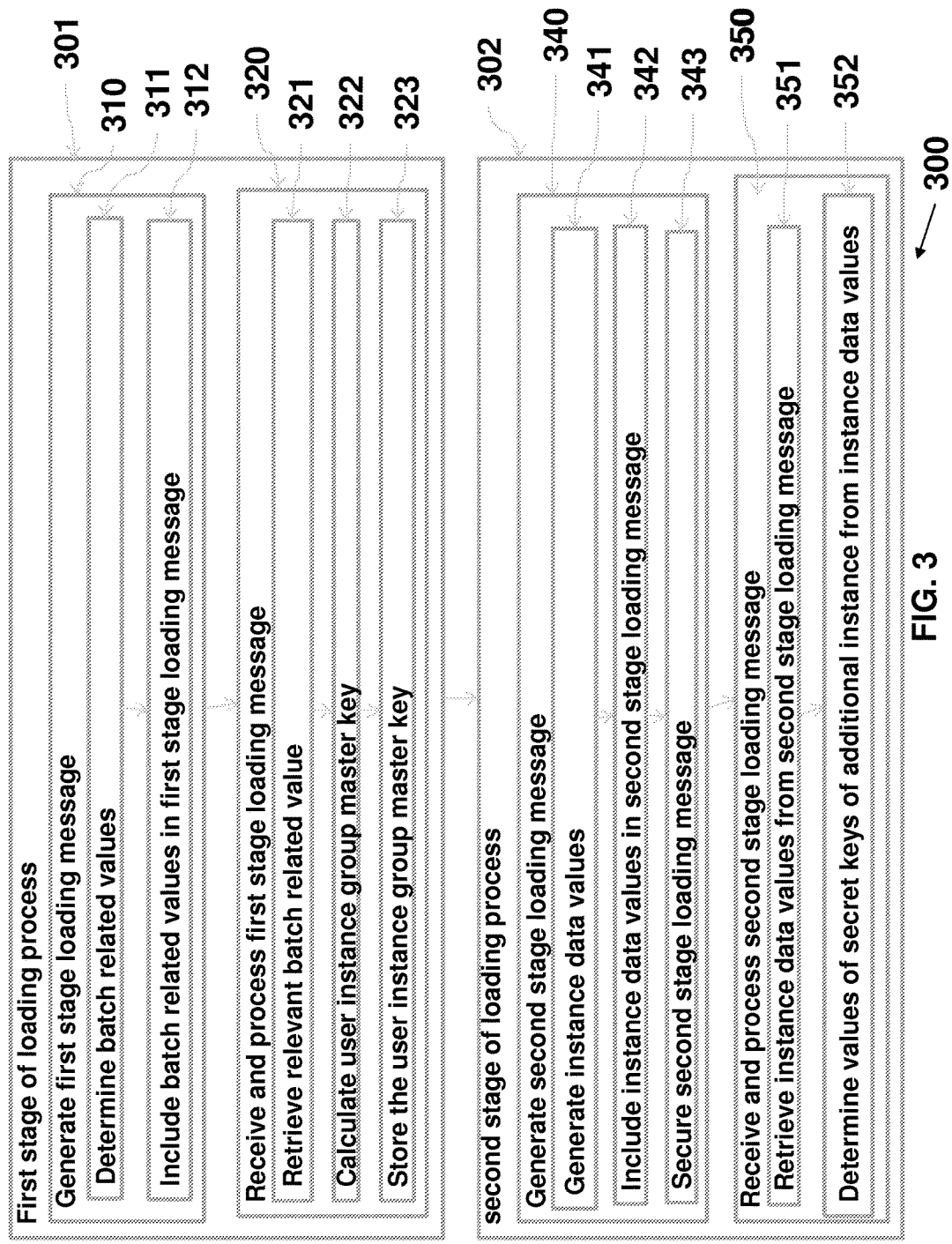
FIG. 3 schematically illustrates an exemplary method according to an aspect of the invention.

FIG. 3 schematically illustrates an exemplary method (300) of the invention according to this third aspect of the invention.

In one embodiment the method may comprise a method (300) for loading an additional token instance into a multi-instance target authentication token adapted to generate dynamic credentials, the method comprising a first loading process stage (301) for transferring to a target authentication token a value of a user instance group master key and a second loading process stage (302) for transferring to the target authentication token a set of instance data values, whereby the target authentication token is comprised in at least one of a plurality of token batches, whereby with each token batch of said plurality of token batches a value of a batch master key is associated and whereby the target authentication token comprises the value of the batch master key of said at least one of said plurality of token batches that comprises the target authentication token.

The first loading process stage (301) may comprise generating (310) a first stage loading message, said generating of said first stage loading message comprising: determining (311) for each of said token batches a batch related value such that it is possible that the same value of a user instance group master key that is associated with a particular instance user group that the additional token instance belongs to, can be calculated as a function of any pair of a batch master key of any particular one of said token batches and the batch related value corresponding to that particular token batch; and including (312) said batch related values into the first stage loading message.

The first loading process stage (301) may further comprise at the target authentication token receiving and processing (320) said first stage loading message, processing said first stage loading message comprising: the target authentication token retrieving (321), from the first stage loading message that it may have received, a batch related value that corresponds to the same token batch that said batch master key, the value of which is comprised in the target authentication token, also corresponds to; the target authentication token calculating (322) the value of the user instance group master key as a function of said batch master key comprised in the target authentication token and said batch related value that the target authentication token has retrieved from the first stage loading message; and the target authentication token storing (323) the calculated value of the user instance group master key.

The second loading process stage (302) may comprise generating (340) a second stage loading message, said generating of said second stage loading message comprising: generating (341) a set of instance data values for the additional token instance; including (342) the generated set of instance data values in the second stage loading message; and securing (343) the second stage loading message with said user instance group master key or a key derived from the user instance group master key.

The second loading process stage (302) may further comprise at the target authentication token receiving and processing (350) the second stage loading message, processing said second stage loading message may comprise: the target authentication token retrieving (351) said set of instance data values from the second stage loading message it has received by using the value of the user instance group master key that the target authentication token has calculated in the first loading process stage; and the target authentication token determining (352) the values of a set of secret keys of said additional token instance by using said retrieved set of instance data values, whereby said set of secret keys of the additional token instance may comprise a secret credential generation key for the authentication token to subsequently use when generating dynamic credentials for said additional token instance.

In a first set of embodiments of the method, the method may comprise any of the instance loading methods previously described and the method may further comprise the following steps.

The method may comprise a preliminary stage, a first loading process stage for transferring to a target authentication token the value of a user instance group master key, and a second loading process stage for transferring to the target a set of instance data values.

The preliminary stage of the method may comprise the following steps. A value of a batch master key may be generated and associated with each token batch of a set of token batches, whereby the value of the batch master key of any particular token batch may be unique for that particular token batch. This step may be done by a batch master key generation server. Then the value of a batch master key may be loaded into, received by and stored in authentication tokens of the token batch. This step may for example be done by a token initialisation device and the authentication tokens. A value of a user instance group master key may be generated and associated with a particular user instance group whereby this value may be unique for that particular user instance group.

The first loading process stage may comprise the following steps. A first instance loading server (or another entity) may generate a first stage loading message (which may also be referred to elsewhere in this application as a first loading message or first user instance group loading message). The first stage loading message may be sent to the target authentication token. This may for example be done by the first loading server and/or another entity. The target authentication token may receive and may process the first stage loading message.

The first loading process stage may further comprise the following steps. For each of said token batches a batch related value may be determined, for example by the first instance loading server or another entity, such that it is possible that the same value of the user instance group master key can be calculated as a function of any pair of a batch master key of any particular one of said token batches and the batch related value corresponding to that particular token batch. The first instance loading server (or another entity) may include the set of batch related values into the first stage loading message. The target authentication token may retrieve from the first stage loading message that it may have received a batch related value that corresponds to the same token batch that a batch master key comprised in the target authentication token also corresponds to. The target authentication token may then calculate the value of the user instance group master key as a function of that batch master key comprised in the target authentication token and the batch related value that the target authentication token may have retrieved. The target authentication token may then store the obtained value of the user instance group master key.

The second loading process stage may comprise the following steps. A second instance loading server (or another entity) may generate a second stage loading message (which may also be referred to elsewhere in this application as a second loading message). The second stage loading message may be sent to the target authentication token. This may for example be done by the second first loading server and/or another entity. The target authentication token may receive and may process the second stage loading message.

The second loading process stage may further comprise the following steps. A set of instance data values may be generated for the additional token instance, for example by the second instance loading server or another entity. The generated set of instance data values may be included in the second stage loading message, for example by the second instance loading server or another entity. The second stage loading message may be secured with the user instance group master key or a key derived from the user instance group master key, for example by the second instance loading server or another entity. The target authentication token may retrieve said set of instance data values from the second stage loading message it has received by using the value of the user instance group master key that the target authentication token may have obtained in the first loading process stage. The target authentication token may determine the values of a set of secret keys of said additional token instance by using said retrieved set of instance data values, whereby said set of secret keys of the additional token instance may comprise the additional token instance's secret credential generation key.

In a second set of embodiments the method may comprise any of the methods of the first set of embodiments whereby each particular batch related value in said first stage loading message may be generated by encrypting the user instance group master key with the batch master key associated with the token batch that said particular batch related value corresponds to and whereby the target authentication token obtains the value of the user instance group master key by decrypting—with said batch master key comprised in the target token—the batch related value comprised in the first stage loading message that corresponds to the token batch that said batch master key comprised in the target token also corresponds to.

In a third set of embodiments the method may comprise any of the methods of the first to second sets of embodiments whereby said set of instance data values comprised in the second stage loading message may be encrypted using the user instance group master key and whereby the target authentication token may retrieve said set of instance data values from the second stage loading message by decrypting the encrypted set of instance data values from the second stage loading message using the value of the user instance group master key that the target authentication token has obtained in the first loading process stage. In some embodiments the set of instance data values comprised in the second stage loading message may be encrypted with the user instance group master key and the target authentication token may retrieve said set of instance data values from the second stage loading message by decrypting the encrypted set of instance data values from the second stage loading message with the value of the user instance group master key that the target authentication token may have obtained in the first loading process stage. In some embodiments the set of instance data values comprised in the second stage loading message may be encrypted with a key derived from the user instance group master key and the target authentication token may retrieve said set of instance data values from the second stage loading message by decrypting the encrypted set of instance data values from the second stage loading message with a key derived from the value of the user instance group master key that the target authentication token may have obtained in the first loading process stage.

In a fourth set of embodiments the method may comprise any of the methods of the first to third sets of embodiments whereby the additional token instance's secret credential generation key may be comprised in said set of instance data values comprised in the second stage loading message.

In a fifth set of embodiments the method may comprise any of the methods of the first to fourth sets of embodiments whereby the target authentication token may derive the additional token instance's secret credential generation key from said set of instance data values comprised in the second stage loading message.

In a sixth set of embodiments the method may comprise any of the methods of the first to fifth sets of embodiments whereby the target authentication token may determine the values of one or more payload keys from said set of instance data values comprised in the second stage loading message, whereby said payload keys may subsequently be used to secure subsequent messages that may be exchanged between an application server and the target authentication token and that may be destined or related to said additional token instance.

In a seventh set of embodiments the method may comprise any of the methods of the first to sixth sets of embodiments whereby the first stage loading message or the second stage loading message may also comprise a data element identifying the additional token instance or a data element identifying the user instance group of the additional token instance.

In an eighth set of embodiments the method may comprise any of the methods of the first to seventh sets of embodiments whereby the first stage loading message or the second stage loading message also comprises other data elements of the additional token instance.

A number of implementations have been described. Nevertheless, it will be understood that various modifications may be made. For example, elements of one or more implementations may be combined, deleted, modified, or supplemented to form further implementations. Accordingly, other implementations are within the scope of the appended claims. In addition, while a particular feature of the present invention may have been disclosed with respect to only one of several implementations, such feature may be combined with one or more other features of the other implementations as may be desired and advantageous for any given or particular application. While various embodiments of the present invention have been described above, it should be understood that they have been presented by way of example only, and not limitation. In particular, it is, of course, not possible to describe every conceivable combination of components or methodologies for purposes of describing the claimed subject matter, but one of ordinary skill in the art may recognize that many further combinations and permutations of the present invention are possible. Thus, the breadth and scope of the present invention should not be limited by any of the above described exemplary embodiments; rather the scope of at least one embodiment of the invention is defined only in accordance with the following claims and their equivalents.

The invention claimed is:

1. A system for authenticating a plurality of at least two different users to a plurality of remotely accessible applications or for securing interaction between said plurality of at least two different users and said plurality of remotely accessible applications, the system comprising:
one or more application servers, each of said application servers configured to host at least one of said plurality of remotely accessible applications; a plurality of authentication tokens, each authentication token comprising a processor and a memory component connected to said processor, the memory component including instructions executed by the processor; each authentication token further comprising one or more token instances of a plurality of token instances, each token instance comprising instance data and associated with a single one of said plurality of at least two different users, at least one of the plurality of authentication tokens comprising at least two different token instances respectively associated with two different users of said plurality of at least two different users; the plurality of token instances grouped in a plurality of mutually disjunctive user instance groups, each different user instance group consisting of token instances that are associated with the same user, each user instance group associated with a unique user instance group key; the processor of each particular authentication token of said plurality of authentication tokens, when executing the instructions, generates a dynamic credential using a secret credential generation key comprised in or derived from the instance data of a selected token instance comprised in said particular authentication token for authenticating a user associated with said selected token instance to one of said applications or for securing interaction between said user associated with said selected token instance and said one of said plurality of remotely accessible applications; the plurality of authentication tokens grouped in a plurality of token batches, a unique batch master key associated with each different token batch, said batch master key comprised in each authentication token comprised in the token batch that said batch master key is associated with, one or more instance loading servers;

the instance loading servers and the authentication tokens supporting an instance loading process for loading an additional token instance into a target authentication token of the plurality of authentication tokens, the instance loading process comprising a first loading process stage for transferring to the target authentication token the value of a user instance group master key and a second loading process stage for transferring to the target authentication token a set of instance data values, a first instance loading server configured to generate, in the first loading process stage, a first stage loading message and to send said first stage loading message to said target authentication token and the target authentication token configured to receive and process said first stage loading message, and a second instance loading server configured to generate, in the second loading process stage, a second stage loading message and to send said second stage loading message to said target authentication token and the target authentication token further configured to receives and processes said second stage loading message, the first stage loading message comprising a set of batch related values, one batch related value for each of said token batches, each batch related value determined such that the same value for the user instance group master key can be calculated as a function of any pair of a batch master key of any particular one of said token batches and the batch related value corresponding to that particular token batch, the processing of the first stage loading message by the target authentication token including the target authentication token calculating the value of the user instance group master key as a function of a batch master key comprised in the target authentication token and the batch related value comprised in the first stage loading message that corresponds to the token batch that said batch master key comprised in the target authentication token also corresponds to, and the second stage loading message comprises said set of instance data values, the second stage loading message secured with the user instance group master key or a key derived from the user instance group master key, and the target authentication token further configured to retrieve said set of instance data values from the second stage loading message by using the value of the user instance group master key that the target authentication token has obtained in the first loading process stage and the target authentication token further configured to determine the values of a set of secret keys of said additional token instance by using said retrieved set of instance data values, said set of secret keys of the additional token instance comprising the additional token instance's secret credential generation key.

2. The system of claim 1, whereby each particular batch related value in said first stage loading message are generated by encrypting the user instance group master key with the batch master key associated with the token batch that said particular batch related value corresponds to and whereby the target authentication token obtains the value of the user instance group master key by decrypting—with said batch master key comprised in the target authentication token—the batch related value comprised in the first stage loading message that corresponds to the token batch that said batch master key comprised in the target authentication token also corresponds to.

3. The system of claim 1, whereby said set of instance data values comprised in the second stage loading message is encrypted using the user instance group master key and whereby the target authentication token retrieves said set of instance data values from the second stage loading message by decrypting the encrypted set of instance data values from the second stage loading message using the value of the user instance group master key that the target authentication token has obtained in the first loading process stage.

4. The system of claim 1, wherein the set of instance data values comprised in the second stage loading message is encrypted with the user instance group master key and the target authentication token retrieves said set of instance data values from the second stage loading message by decrypting the encrypted set of instance data values from the second stage loading message with the value of the user instance group master key that the target authentication token obtained in the first loading process stage.

5. The system of claim 1, wherein the set of instance data values comprised in the second stage loading message are encrypted with a key derived from the user instance group master key and the target authentication token retrieves said set of instance data values from the second stage loading message by decrypting the encrypted set of instance data values from the second stage loading message with a key derived from the value of the user instance group master key that the target authentication token obtained in the first loading process stage.

6. The system of claim 1, whereby the additional token instance's secret credential generation key is comprised in said set of instance data values comprised in the second stage loading message.

7. The system of claim 1, whereby the target authentication token derives the additional token instance's secret credential generation key from said set of instance data values comprised in the second stage loading message.

8. The system of claim 1, whereby the target authentication token determines the values of one or more payload keys from said set of instance data values comprised in the second stage loading message, whereby said payload keys are subsequently used to secure subsequent messages exchanged between an application server and the target authentication token and destined or related to said additional token instance.

9. The system of claim 1, whereby the first stage loading message or the second stage loading message also comprises a data element identifying the additional token instance or a data element identifying the user instance group of the additional token instance.

10. The system of claim 1, whereby the first stage loading message or the second stage loading message also comprises other data elements of the additional token instance.

11. An authentication token for authenticating more than one users to one or more applications or for securing interaction between said more than one users and said one or more applications, the authentication token comprising:
- a processor, a memory component connected to said processor, the memory component including instructions executed by the processor, and a plurality of token instances, each token instance comprising instance data and each token instance associated with one of a plurality of at least two different users of the authentication token whereby at least one different token instance is associated with each of said plurality of at least two different users;
- the processor of the authentication token, when executing the instructions, generating a dynamic credential using a secret credential generation key comprised in or derived from the instance data of a selected token instance of said plurality of token instances for authenticating a user associated with said selected token instance or for securing interaction between said user associated with said selected token instance and one or more applications; the authentication token receiving a server message and decoding and processing said server message; and said received server message targeted towards a particular targeted token instance of said plurality of token instances and the authentication token autonomously determining and selecting without using inputs of a user of the authentication token said targeted token instance on the basis of said received server message.

12. The authentication token of claim 11, whereby the token is further adapted to determine and select the targeted token instance using a token instance identifying data element in the received server message.

13. The authentication token of claim 11, whereby the token is further adapted to determine and select the targeted token instance by verifying a cryptographically protected element or aspect of said received server message using a cryptographic algorithm parameterized with a cryptographic payload key associated with a candidate token instance of said plurality of token instances, whereby the token is adapted to select said candidate token instance as the targeted token instance if said verification is successful.

14. The authentication token of claim 13, whereby the token is further adapted to cycle through the plurality of token instances and considering or trying out one by one each of said plurality of token instances as a candidate at least until said verifying of a cryptographically protected element or aspect of said received server message with any candidate token instance yields a candidate token instance for which said verifying is successful or until said verifying of a cryptographically protected element or aspect of said received server message with all token instances of the plurality of token instances has not been successful for any of the token instances of the plurality of token instances.

15. The authentication token of claim 14, whereby the token is further adapted to select the first token instance for which said verifying of a cryptographically protected element or aspect of said received server message is successful.

16. The authentication token of claim 14, whereby the token is further adapted to reject said server message if the token doesn't find a candidate token instance for which said verifying of a cryptographically protected element or aspect of said received server message is successful.

17. The authentication token of claim 14, wherein each token instance of said plurality of token instances has a unique value for said payload key with respect to the payload key values of the other token instances of said plurality of token instances.

18. The authentication token of claim 11, whereby said received server message comprises a credential generation command message and the token is further adapted to generate said dynamic credential in response to said credential generation command message.

19. The authentication token of claim 11, whereby said received server message comprises a credential generation command message and the token is further adapted to generate said dynamic credential in response to said credential generation command message and said selected token instance is said targeted token instance targeted by said received server message.

20. The authentication token of claim 11, whereby the token is further adapted to use a symmetric cryptographic algorithm in said generating of a dynamic credential, said symmetric cryptographic algorithm parameterized with said secret credential generation key, said secret credential generation key comprising a symmetric secret key.

21. An authentication token for authenticating more than one users to one or more applications or for securing interaction between said more than one users and said one or more applications, the authentication token comprising:
- a processor, a memory component connected to said processor, the memory component storing instructions executed by the processor, and
- a plurality of token instances, each token instance comprising instance data and each token instance associated with one of a plurality of at least two different users of the token whereby at least one different token instance is associated with each of said plurality of at least two different users;
- the processor of the authentication token, when executing the instructions generating a dynamic credential using a secret credential generation key comprised in or derived from the instance data of a selected token instance of said plurality of token instances for authenticating a user associated with said selected token instance to said one or more applications or for securing interaction between said user associated with said selected token instance and said one or more applications;
- the authentication token receiving an additional token instance, the authentication token is comprised in at least one of a plurality of token batches, each token batch of said plurality of token batches associated with a value of a batch master key and the authentication token comprising the value of the batch master key of said at least one of said plurality of token batches that comprises the authentication token; the authentication token further receiving and processing, as part of a first loading process stage for transferring to the authentication token a value of a user instance group master key, a first stage loading message that comprises a set of batch related values, one batch related value for each of said token batches, the value of each batch related value determined such that it is possible to calculate the same value of said user instance group master key, as a function of any pair of a batch master key of any particular one of said token batches and the batch related value corresponding to that particular token batch,
- the authentication token processing said first stage loading message comprises: the authentication token retrieving from the first stage loading message that it has received a batch related value that corresponds to the same token batch that said batch master key, the value of which is comprised in the target authentication token, also corresponds to; the authentication token calculating the value of the user instance group master key as a function of said batch master key comprised in the target authentication token and said batch related value that the target authentication token has retrieved from the first stage loading message; and the authentication token storing the calculated value of the user instance group master key;

the authentication token receiving and processing, as part of a second loading process stage for transferring to the authentication token a set of instance data values for the additional token instance, a second stage loading message that includes said set of instance data values for the additional token instance and that is secured with said user instance group master key or a key derived from the user instance group master key, the authentication token processing said second stage loading message comprises: the authentication token retrieving said set of instance data values from the second stage loading message it has received by using the value of the user instance group master key that the authentication token has calculated in the first loading process stage; and the authentication token determining the values of a set of secret keys of said additional token instance by using said retrieved set of instance data values, said set of secret keys of the additional token instance comprises a secret credential generation key for the authentication token to subsequently use when generating dynamic credentials for said additional token instance.

22. An authentication token for authenticating more than one users to one or more applications or for securing interaction between said more than one users and said one or more applications, the authentication token comprising: a processor, a memory component connected to said processor, the memory component storing instructions executed by the processor, and a plurality of token instances, each token instance comprising instance data and each token instance associated with one of a plurality of at least two different users of the token whereby at least one different token instance is associated with each of said plurality of at least two different users;

the processor of the authentication token, when executing the instructions, generating a dynamic credential using a secret credential generation key comprised in or derived from the instance data of a selected token instance of said plurality of token instances for authenticating a user associated with said selected token instance to said one or more applications or for securing interaction between said user associated with said selected token instance and said one or more applications; and the authentication token supporting an instance removal process to remove at least one obsolete token instance of said plurality of token instances.

23. The authentication token of claim 22, whereby the token is further adapted to present the user a menu option for the user to initiate said instance removal process.

24. The authentication token of claim 22, whereby the token is further adapted to present the user a menu for the user to select said obsolete token instance that the user wants the token to remove.

25. The authentication token of claim 22, whereby the token is further adapted to receive and process an instance removal command message, wherein said processing of said received instance removal command message comprises removing said at least one obsolete token instances to be removed in response to said received instance removal command message.

26. The authentication token of claim 25, whereby the token is further adapted to select said at least one obsolete token instances for which the instance removal process is to be performed autonomously on the basis of the received instance removal command message.

27. An authentication token for authenticating more than one users to one or more applications or for securing interaction between said more than one users and said one or more applications, the authentication token comprising:

a processor, a memory component connected to said processor, the memory component storing instructions executed by the processor, and a plurality of token instances, each token instance comprising instance data and each token instance associated with one of a plurality of at least two different users of the token whereby at least one different token instance is associated with each of said plurality of at least two different users;

the processor of the authentication token, when executing the instructions, generating a dynamic credential using a secret credential generation key comprised in or derived from the instance data of a selected token instance of said plurality of token instances for authenticating a user associated with said selected token instance to said one more applications or for securing interaction between said user associated with said selected token instance and said one or more applications; and the authentication token reserving the use of at least one protected token instance of said plurality of token instances to a user associated with that at least one protected token instance.

28. The authentication token of claim 27, whereby the instance data of said at least one protected token instance comprises user credential reference data, and whereby the token is further adapted to receive from the user a user credential, to compare the user credential received from the user with said user credential reference data, and to allow the user to use said at least one protected token instance if the received user credential matches said user credential reference data and to refuse the user to use said at least one protected token instance if the received user credential doesn't match said user credential reference data.

29. The authentication token of claim 28, whereby the user credential reference data comprises a password reference value and said user credential comprises a password value.

30. The authentication token of claim 29, whereby the token is further adapted to support a password change process to permit the user to change the user credential reference data of the at least one protected token instance.

31. The authentication token of claim 30, whereby the token is further adapted to present the user a menu option for the user to initiate said password change process.

32. The authentication token of claim 31, whereby the token may be further adapted to present the user a menu for the user to select the at least one protected token instance for which the user wants the token to perform the password change process.

33. The authentication token of claim 29, whereby the token is further adapted to receive and process a password change command message, wherein said processing of said received password change command message comprises initiating and performing the password change process in response to said received password change command message.

34. The authentication token of claim 33, whereby the token is further adapted to autonomously select the at least one protected token instance for which the password change process is to be performed on the basis of the received password change command message.

35. The authentication token of claim 29, whereby the token is further adapted to lock the at least one protected token instance if the user has provided for the at least one protected token instance a number of password values that don't match the password reference value of the at least one protected token instance whereby said number exceeds a predefined password try counter threshold value.

36. The authentication token of claim 35, whereby the token is further adapted to support a password unlock process to permit the user to undo said locking of said locked at least one protected token instance.

37. The authentication token of claim 36, whereby the token is further adapted to present the user a menu option for the user to initiate said password unlock process.

38. The authentication token of claim 37, whereby the token is further adapted to present the user a menu for the user to select the locked at least one protected token instance for which the user wants the token to perform the password unlock process.

39. The authentication token of claim 38, whereby the token is further adapted to receive and process a password unlock command message, wherein said processing of said received password unlock command message comprises initiating and performing the password unlock process in response to said received password unlock command message.

40. The authentication token of claim 38, whereby the token is further adapted to autonomously select the locked at least one protected token instance for which the password unlock process is to be performed on the basis of the received password unlock command message.

41. A method for loading an additional token instance into a multi-instance target authentication token adapted to generate dynamic credentials, the multi-instance target authentication token comprising a processor and a memory storing instructions executed by the processor, the method comprising a first loading process stage for transferring to a target authentication token a value of a user instance group master key and a second loading process stage for transferring to the target authentication token a set of instance data values, the target authentication token is comprised in at least one of a plurality of token batches, each token batch of said plurality of token batches associated with a value of a batch master key and the target authentication token comprising the value of the batch master key of said at least one of said plurality of token batches that comprises the target authentication token; the first loading process stage comprising: generating a first stage loading message, said generating of said first stage loading message comprising: determining for each of said token batches a batch related value such that it is possible that the same value of a user instance group master key that is associated with a particular instance user group that the additional token instance belongs to, can be calculated as a function of any pair of a batch master key of any particular one of said token batches and the batch related value corresponding to that particular token batch, including said batch related values into the first stage loading message; at the target authentication token, receiving said first stage loading message and processing, by the processor executing the instructions, said first stage loading message, processing said first stage loading message by the processor executing the instructions comprising: the target authentication token retrieving from the first stage loading message a batch related value that corresponds to the same token batch that said batch master key, the value of which is comprised in the target authentication token, also corresponds to; the target authentication token calculating the value of the user instance group master key as a function of said batch master key comprised in the target authentication token and said batch related value that the target authentication token has retrieved from the first stage loading message; and the target authentication token storing the calculated value of the user instance group master key; the second loading process stage comprising: generating a second stage loading message, said generating of said second stage loading message comprising: generating a set of instance data values for the additional token instance; including the generated set of instance data values in the second stage loading message; and securing the second stage loading message with said user instance group master key or a key derived from the user instance group master key; at the target authentication token, receiving said second stage loading message and processing by the processor executing the instructions the second stage loading message, processing said second stage loading message by the processor executing the instructions comprising: the target authentication token retrieving said set of instance data values from the second stage loading message by using the value of the user instance group master key that the target authentication token has calculated in the first loading process stage; and the target authentication token determining the values of a set of secret keys of said additional token instance by using said retrieved set of instance data values, said set of secret keys of the additional token instance comprising a secret credential generation key for the authentication token to subsequently use when generating dynamic credentials for said additional token instance.

42. A method for loading an additional token instance by a server into a multi-instance target authentication token adapted to generate dynamic credentials, the server comprising a processor and a memory storing instructions executed by the processor, the method comprising a first loading process stage for transferring to a target authentication token a value of a user instance group master key and a second loading process stage for transferring to the target authentication token a set of instance data values, the target authentication token is comprised in at least one of a plurality of token batches, each token batch of said plurality of token batches associated with a value of a batch master key and the target authentication token comprising the value of the batch master key of said at least one of said plurality of token batches that comprises the target authentication token;

the first loading process stage comprising:

generating a first stage loading message, said generating of said first stage loading message comprising the processor executing the instructions to: determine for each of said token batches a batch related value such that it is possible that the same value of a user instance group master key that is associated with a particular instance user group that the additional token instance belongs to, can be calculated as a function of any pair of a batch master key of any particular one of said token batches and the batch related value corresponding to that particular token batch, and include said batch related values into the first stage loading message; sending said first stage loading message to said target authentication token; the second loading process stage comprising: generating a second stage loading message, said generating of said second stage loading message comprising the processor executing the instructions to: generate a set of instance data values for the additional token instance; and include the generated set of instance data values in the second stage loading message; and securing the second stage loading message with said user instance group master key or a key derived from the user instance group master key; and sending said second stage loading message to said target authentication token.

43. A method for receiving an additional token instance into a multi-instance target authentication token adapted to generate dynamic credentials, the multi-instance target authentication token comprising a processor and a memory storing instructions executed by the processor, the method comprising a first loading process stage for transferring to a target authentication token a value of a user instance group master key, and a second loading process stage for transferring to the target authentication token a set of instance data values for the additional token instance, the target authentication token comprised in at least one of a plurality of token batches, each token batch of said plurality of token batches associated with a value of a batch master key is associated and whereby the target authentication token comprising the value of the batch master key of said at least one of said plurality of token batches that comprises the target authentication token; the first loading process stage comprising the target authentication token receiving a first stage loading message that comprises a set of batch related values and the processor of the target authentication token, when executing the instructions, processing the first stage loading message, one batch related value for each of said token batches, the value of each batch related value determined such that it is possible to calculate the same value of said user instance group master key, as a function of any pair of a batch master key of any particular one of said token batches and the batch related value corresponding to that particular token batch, processing said first stage loading message by the processor executing the instructions comprising:

the target authentication token retrieving from the first stage loading message a batch related value that corresponds to the same token batch that said batch master key, the value of which is comprised in the target authentication token, also corresponds to; the target authentication token calculating the value of the user instance group master key as a function of said batch master key comprised in the target authentication token and said batch related value that the target authentication token has retrieved from the first stage loading message; and the target authentication token storing the calculated value of the user instance group master key; the second loading process stage comprising the target authentication token receiving a second stage loading message that includes said set of instance data values for the additional token instance and that is secured with said user instance group master key or a key derived from the user instance group master key and the processor of the target authentication token, when executing the instructions, processing the second stage loading message processing said second stage loading message by the processor executing the instructions comprising: the target authentication token retrieving said set of instance data values from the second stage loading message it has received by using the value of the user instance group master key that the target authentication token has calculated in the first loading process stage; and the target authentication token determining the values of a set of secret keys of said additional token instance by using said retrieved set of instance data values, whereby said set of secret keys of the additional token instance comprises a secret credential generation key for the authentication token to subsequently use when generating dynamic credentials for said additional token instance.

44. The system of claim 1, wherein all token instances of any particular user instance group of said plurality of mutually disjunctive user instance groups are associated with the same user and a same application or set of applications of said plurality of remotely accessible applications.

45. The system of claim 1, wherein all token instances comprised in any particular authentication token of said plurality of authentication tokens belong to different user instance groups of said plurality of mutually disjunctive user instance groups.

* * * * *